US005389919A

United States Patent [19]

Warren et al.

[11] Patent Number: 5,389,919

[45] Date of Patent: * Feb. 14, 1995

[54] ELECTRONIC INTERLOCK FOR STORAGE ASSEMBLIES WITH COMMUNICATION

[75] Inventors: Edward L. Warren, Spring Lake; David E. Miller, West Olive; James Arter, North Muskegon, all of Mich.

[73] Assignee: Meridian, Inc., Spring Lake, Mich.

[*] Notice: The portion of the term of this patent subsequent to Jul. 6, 2010 has been disclaimed.

[21] Appl. No.: 979,000

[22] Filed: Nov. 19, 1992

Related U.S. Application Data

[63] Continuation of Ser. No. 599,676, Oct. 17, 1990, Pat. No. 5,225,825, which is a continuation-in-part of Ser. No. 505,037, Apr. 5, 1990, abandoned.

[51] Int. Cl.[6] .............................................. H04Q 1/00

[52] U.S. Cl. ................................ 340/825.31; 70/278; 109/7; 235/382

[58] Field of Search ...................... 340/825.31, 825.32, 340/825.3, 825.33, 825.34, 825.35; 109/7; 70/78, 85, 278, 280, 282; 312/183, 187, 215, 220, 222; 209/610, 611; 235/382, 382.5; 221/215, 7, 86, 89–91, 125, 155

[56] References Cited

U.S. PATENT DOCUMENTS 2,013,012 9/1935 Tauschek .
3,401,998 9/1968 Evans .
3,648,241 3/1972 Naito et al. .
3,829,834 8/1974 Frankland et al. ............. 340/825.32
4,267,942 5/1981 Wick, Jr. et al. .
4,303,287 12/1981 Taplin .
4,616,111 3/1988 Vasquez .
4,636,634 1/1987 Harper et al. .
4,661,806 4/1987 Peters et al. .
4,732,433 3/1988 Bruneau .
4,811,012 3/1989 Rollins .
4,839,499 6/1989 Kotecki et al. .
4,839,875 6/1989 Kuriyama et al. .
4,866,661 9/1989 de Prins .
4,889,396 12/1989 Mitchell et al. .
4,927,051 5/1990 Falk et al. .

FOREIGN PATENT DOCUMENTS 0065605 1/1982 European Pat. Off. .
841401 1/1976 France .

*Primary Examiner*—Donald J. Yusko
*Assistant Examiner*—John E. Giust
*Attorney, Agent, or Firm*—Reising, Ethington, Barnard, Perry & Milton

[57] ABSTRACT

An electronic interlock for locking a file cabinet (10, 100) and for limiting the number of drawers (14, 114) to be accessed at any given time. An input keyboard (20, 120) receives an input code to be compared with a prestored access code. If the codes do not match, an unlock signal is not produced. If the input code matches the access code, a processor (28, 148) renders the storage assembly (10, 110) accessible. The processor (28, 128) will receive a drawer selection number from the input keyboard (20, 120) user and will unlock a lock (16, 116) associated with the selected drawer (14, 114). Sensors (34, 134) sense the position of the drawers (14, 114) and disable the processor (28, 128) when one of the drawers (14, 114) is in the open position.

27 Claims, 14 Drawing Sheets

ELECTRONIC INTERLOCK FOR STORAGE ASSEMBLIES WITH COMMUNICATION

RELATED APPLICATION

This application is a continuation of Ser. No. 599,676, filed Oct. 17, 1990, now U.S. Pat. No. 5,225,825, issued Jul. 6, 1993, which was a continuation-in-part of U.S. Ser. No. 505,037, filed Apr. 5, 1990, now abandoned.

BACKGROUND OF THE INVENTION

1. Field of the Invention

This invention relates to electronically controlled storage assemblies. More particularly, this invention relates to storage assemblies with electronic interlock locking control assemblies.

2. Description of Related Art

It is well known that storage assemblies, such as file cabinets, use locking assemblies to protect the articles stored within the assembly. Common locking assemblies utilize mechanisms such as key locks or combination locks. The systems work well in their ability to secure the contents of the storage cabinet. An electronic lock that locks all the drawers on the desk by pressing one button is known.

U.S. Pat. No. 3,648,241 to Naito et al discloses an electronically controlled and locked stationary stack assembly which comprises a plurality of vertically and horizontally spaced storage units. A control panel receives inputs which correspond to access codes and position codes. The access codes may or may not be restrictive as to the areas of the stack assembly the user has access. The position codes release a particular file or drawer space the user wishes to retrieve. Although this assembly does limit access of the contents of the assembly, thus increasing security, it does not enhance safety. A user may access all of the drawers at one time, given the proper code, and the center of gravity may move sufficiently to tip and fall over onto the user.

U.S. Pat. No. 4,811,012 to Rollins discloses an electronic locking system for a building which comprises an enclosure with exterior and interior doors. The electronic locking system comprises individual locks on every door with a number of access codes with which the individual locks unlock their respective door. The disclosure includes an alternative embodiment including the ability to program the electronic lock system via software means. However, no part of this disclosure discusses limiting the access to the building rooms to one at a time. In fact, there are no safety ramifications in accessing one of the doors at a time or all the doors at once.

Currently, two systems are incorporated into tall storage cabinets such as filing cabinets; a locking system is needed to secure the contents when desired, and another system is used to limit the number of drawers to be opened at any one time to one. This prevents the center of gravity from shifting too far forward, thus preventing the hazard of the file cabinet from tipping over onto the user. This duplication of interlocking systems is financially costly and space inefficient.

SUMMARY OF THE INVENTION AND ADVANTAGES

A storage assembly comprising a housing means which defines an enclosure for a plurality of storage units to be supported by the housing. The storage units are able to move between a closed position and an open position. The storage assembly includes a plurality of independent locking means associated with each of the plurality of storage units. The locking means move between a locked condition for locking the associated storage unit in the closed position in response to a lock signal and an unlocked condition for unlocking and allowing the associated storage unit to move to the open position in response to an unlock signal. Control means is connected to the locking means for unlocking and locking the locking means. The control means includes input means for receiving an input code, memory means for storing an access code, and sensing means operatively connected to each the storage units for sensing the position of the storage units to produce an enable signal when all of the storage units are in the closed position and a disable signal when at least one of the storage units is in the open position. The control means also includes processor means connected to the input means and the data memory means and the sensing means for receiving and comparing the access code with the input code to produce the unlock signal when said access code equals the input code and the enable signal is produced.

Also includes is a method of providing limited access to a storage assembly having a plurality of storage units movable between a closed position and an open position within a housing. The method including the steps of storing an access code, receiving an input code, sensing the position of the storage units, producing an enable signal when all of the storage units are in the closed position, producing a disable signal when at least one of the storage units is in the open position, locking the storage units in the closed position when the input code is not equal to the access code, unlocking the storage units from the closed position when the input code equals the access code and the enable signal is produced, and locking the remaining storage units upon production of the disable signal.

The advantages associated with this invention are the reduction of the parts and the ability to increase security. First, the invention uses the same system for limiting access to one drawer at a time, as it does for locking the file cabinet. Second, the invention allows for automatic logging of the usage of the file cabinet via external processing.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
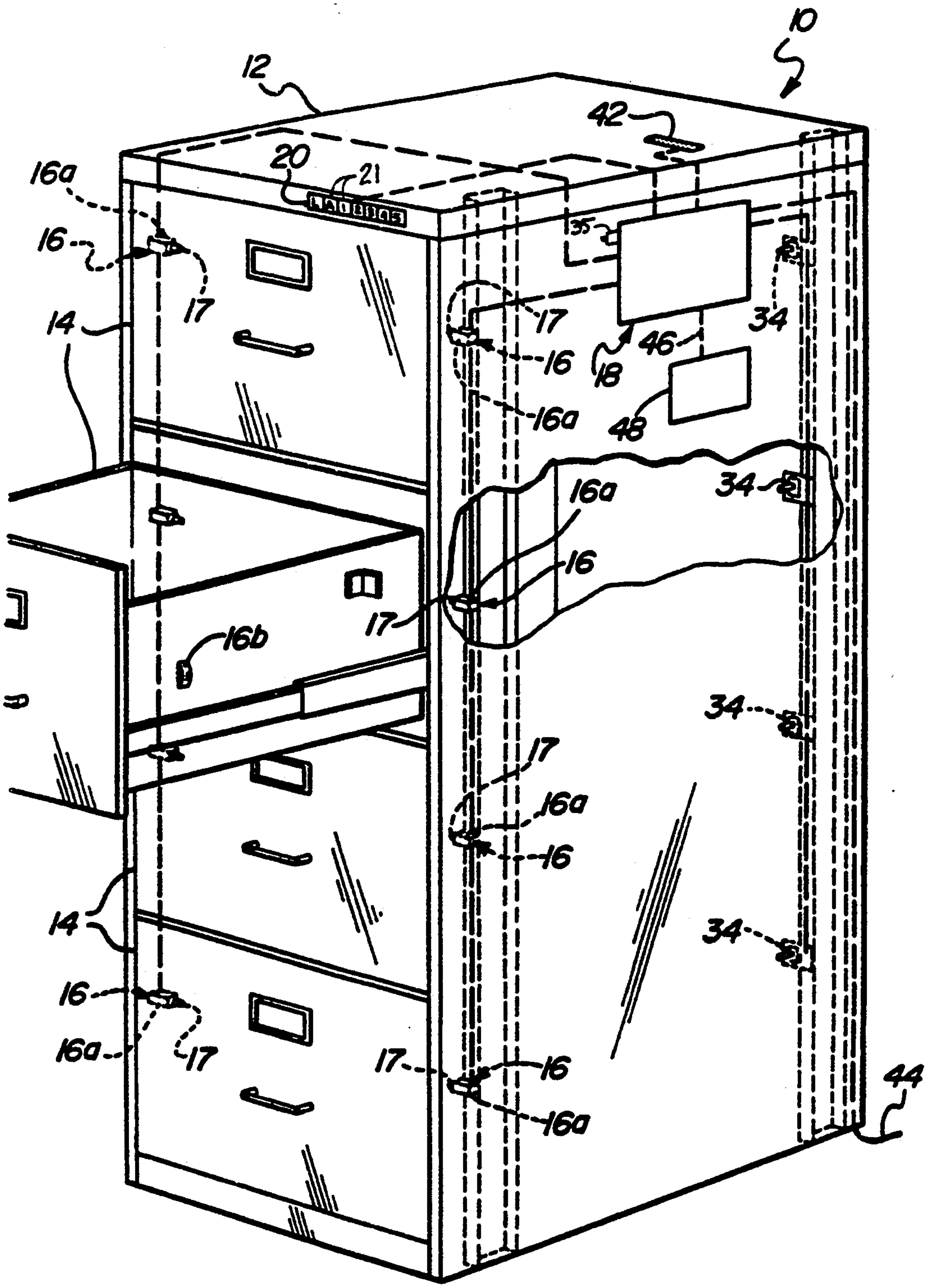
FIG. 1 is a perspective view partially cutaway of a first embodiment of the subject invention.

A storage assembly, generally shown at 10 and 100, comprises a housing means 12, 112 that defines an enclosure. The housing means 12, 112 houses a plurality of storage units 14, 114. These storage units 14, 114 are supported by the housing means 12, 112 for movement between a closed position and an open position.

The storage assembly 10, 110 further comprises individual locking means 16, 116 for movement between a locked condition for locking the associated storage units 14, 114 in the closed position and an unlocked condition for allowing the associated storage unit 14, 114 to move to the open position. In the preferred embodiment, the locking means 16, 116 comprises a plunger 17, 117 operated by a solenoid **16*a*, 116*a* and a storage unit protrusion 16*b*, 116*b*. When the plunger 17, 117 of the solenoid 16*a*, 116*a* is in the extended position, the plunger 17, 117 prevents the storage unit protrusion 16*b*, 116*b* and, therefore, the storage unit 14, 114** from moving to the open position.

Control means 18, 110 produces an actuation signal for controlling the solenoid **16*a*, 116*a*. The assembly 10, 100 includes a first embodiment 10 illustrated in FIGS. 1–2, and a second embodiment 100** illustrated in FIGS. 3–7 and will be explained individually with similarities noted.

This control means 18 comprises an input means 20 for receiving an input code. The input means 20 is a typical alphanumeric keyboard, which is common in the art. The input means 20 includes a plurality of key buttons 21 wherein the contacts at the tips of the buttons 21 produce a logic high or one. The input means 20 will then provide a signal characteristic of the depressed button 21 to a first memory means 22 and a comparing means 24. The input means 20 is used also for inputting the access code. An access code is stored in the first memory means 22 and is used to be compared with the input code. The first memory means 22 is generally a buffer which has the capability of storing several access codes. When the input code is entered, the first memory means 22 unloads all of its stored access codes serially and sends them to comparing means 24 to be compared. This process stops when an access code is matched with the input code or when there are no more access codes with which to compare the input code.

The comparison is done by the comparing means 24. The comparing means 24 will receive the input code and access code and store them in two separate temporary buffers 25, 27. The comparing means 24 will then compare the two codes using a digital circuit. If the two codes do not match correctly, the buffer 25 containing the access code will enter the next access code to be compared. If none of the access codes match, the comparing means 24 will not produce an unlock signal. If the input code matches the access code, the comparing means 24 will produce the unlock signal which will be received by selection means 26. The selection means 26 may be any type of input device that is capable of associating an input with the proper storage unit 14. Such devices that are common to the art are analog dials and digital keypads. The selection means 26 used in control means 18 includes a digital keypad and, in order to avoid duplicity of parts and increased costs, the selection means 26 may utilize the buttons 21 of the alphanumeric keypad 20.

The selection means 26 operates in two modes. The first of which occurs upon the selection means 26 not receiving the unlock signal from the comparing means 24. In this mode, the selection means 26 remains in an inoperable mode, i.e., it will not allow a user to select a storage unit 14.

When, however, the selection means 26 receives an unlocked signal from the comparing means 24, the selection means 26 enters its second mode of operation. The selection means 26 becomes operable and the user may select a specific storage unit 14 to unlock and move into the open position. The digital logic used to control the mode in which the selection means 26 is to be operated may be a simple AND circuit. Once a storage unit 14 has been selected, a coded signal indicative of that particular storage unit 14 will be produced. For example, if the number two keypad is depressed and an unlock signal has been produced by the comparing means 24, the AND circuit will produce the coded signal indicative of number two keypad due to the presence of signals at its inputs.

The control means 18 is characterized by including limiting means 28. The limiting means 28 is a circuit that receives the coded signal from the selection means 26. The limiting means 28 then determines to which storage unit 14 the coded signal represents. Again, this is done using simple digital logic. The limiting means 28 allows current to flow to the locking means 16 of the selected storage unit 14. The locking means 16 associated with the remaining storage units 14 are unaffected by the limiting means 28. These remaining storage units 14 remain locked in the closed position when any one of the storage units 14 is unlocked and opened.

In the preferred embodiment, the limiting means 28 comprises a processor means 30. The coded signal is received by the processor means 30. The processor means 30 processes the coded signal and outputs an actuation signal which is sent to the locking means 16 of the indicated storage unit 14. The output of the processor means 30 or the actuation signal, may be a serial output in which the individual locking means 16 are connected serially or it may be in parallel form. The preferred embodiment shows each of the individual locking means 16 to be connected to the processor means 30 in parallel form. Thus, the processor means 30 produces an on/off signal, i.e., the actuation signal, and activates only one of the individual locking means 16 at a time.

In other words, the processor means 30 receives the coded signal indicative of one of the storage units 14 and produces the actuation signal to be sent through actuation means 33 associated with each storage unit 14. The preferred embodiment defines the actuation means 33 to be a hard-wired coupling. The processor means 30 is hard wired 33 to each locking means 16 and therefore each locking means 16 is independently controlled by the processor means 30. This is to be in no way limiting as it may be appreciated to one skilled in the art that any electronic coupling, i.e., radio waves, may be acceptable for such an operation.

The control means 18 further includes sensing means 34 associated with each of the storage units 14. Each sensing means 34 senses the position of its associated storage unit 14. The sensing means 34 sends a signal indicative of either the open position or the closed position.

Disabling means 36 receives the indication signals produced by each of the sensing means 34 and disables the processor means 30 when one of the indication signals indicates one of the storage units 14 is in the open position. The processor means 30 is enabled as soon as the sensing means 34 senses all of the storage units in the closed position. The disabling means 36 transmits a disable/enable signal to the processor means 30.

The first memory means 22 has enough memory capability for storing more than one access code. Having more than one access code allows different personnel different levels of entry. For example, a manager may have control over several different file cabinets. It would be very difficult for him to remember each access code for each file cabinet. Therefore, the manager needs only to know one access code for all file cabinets whereas each file cabinet may have a different access code corresponding to the department in which it is located.

The input means 20 has an additional capability for transferring a new access code to the first memory means 22. The transfer means 38 is activated when the input means 20 is placed in second mode of operation. This is done by pressing the program button 35 not located with the majority of the input means 20, and then entering the new access code. Entering a new access code enhances the security level of the file cabinet system and allows employees using the file cabinets to change the old access code when it is forgotten by authorized personnel or discovered by unauthorized personnel.

A second memory means 40 is incorporated into the control means 18. Information relating to the time of an access and the code which is used to access the storage assembly 10 are stored in the second memory means 40. The second memory means 40 includes an interface means 42 for transferring the information of the second memory means 40 to an external processor means.

The control means 18 further includes a first power interface means 44 for receiving power external of the housing means 12. Any adaptor suitable for receiving power from a standard plug may be used. The control means 18 also includes a second power interface 46 which is within the housing means 12 and is used for receiving stored energy from a battery 48 wherein the stored energy is used in an emergency situations.

In operation, a user will use the method of inputting the input code through the input means 20. The access code, currently in the first memory means 22, is compared with the input code by the comparing means 24. Dependent upon the comparison results, a lock or unlock signal is produced from the comparing means 24 and is sent to the selection means 26. If a lock signal is sent to the selection means 26, the second memory means 40 will record the attempted entry. If an unlock signal is sent to the selection means 26, the user then inputs through the input means 20 a code, usually a number, representative of a individual storage unit 14. The second memory means 40 will record the entry and the storage unit 14 selected. The coded signal from the selection means 26 then is received by the processor means 30. The processor means 30 produces an actuation signal. The actuation signal is sent to the individual locking means 16 associated with the storage unit 14. The storage unit 14 then has a window of time in which it may be moved into the open position. Once the storage unit 14 is in the open position, the associated sensor means 34 senses the storage unit 14 in the open position and sends a disabling signal to the disabling means 36 which disables the processor means 30 from sending any actuation signals to any other storage unit 14.

Once the selected storage unit 14 is moved back into the closed position, the sensing means 34 stops sending a disabling signal which allows the processor means 30 to process another actuation signal to allow another storage unit 14 to enter the open position.

Each time a user inputs a selection the second memory means 40 records the selection and the time. When requested through the use of an external processing unit, the interface means 42 will access the second memory means 40 and the data will be displayed via an appropriate medium for the specified period of time.

The input means 20, when in the second mode of operation, allows the user to enter a new access code to be stored in the first memory means 22. This new access code will be the access code with which the subsequent input codes will have to match.

The assembly heretofore described may be implemented by commonly available off-the-shelf products as one skilled in the art could assemble. One such implementation may include the following. The input means 20 includes a keypad which supplies a code to buffers 25, 27. If the code is an input code, the input code is stored in the input buffer 27. If the code is an access code, determined by the initial depression of the program key 35, a plurality of access codes are stored in first memory means 22, which may be a RAM. The access code is then transmitted to the access buffer 25. The buffers 25, 27 may be simple off-the-shelf buffers, registers or latches. The comparing means 24, which may be a general comparator such as an operational amplifier configured as a comparator or an AND gate combination as commonly known in the art, receives the input from input buffer 27 and the access buffer 25. If the input code matches the access code, an unlock signal is transmitted to the selection means 26. As previously stated, the selection means 26 includes a keypad and an AND gate. The AND gate receives the unlock signal and a signal representative of the key depressed from the key pad which will correlate with one of the drawers. If the AND gate receives both the unlock signal and a selected key signal, the selected coded key signal is sent to the processor means 30. If either the unlock signal is not present or a key selection is not depressed, no signal will be sent to the processor means 30.

The disabling means 36 is responsive to sensing means 34 which senses drawer closure. The disabling means 36 may be an AND gate wherein as long as all of the sensing means 34 indicate that their respective storage unit 14 is closed, the disabling means 36 will transmit an enabling signal to the processor means 30. Upon the condition that any one of the sensing means 34 indicates an open drawer condition, the disabling means 36 will transmit a signal indicative of the disablement.

The sensing means 34 may be a simple contact switch which is in the contacting position when the storage unit 14 is open thereby transmitting an open signal to the disabling means 36, and which is in the noncontacting position when the storage unit 14 is closed transmitting a close signal.

The processor means 30 is a typical microprocessor having memory capabilities or microcomputer, which is commonly known in the art. The processor means 30 merely receives the coded signal which indicates the selected storage unit 14. The processor means 30 also receives the enable signal from the disabling means 36.

Figure 2:
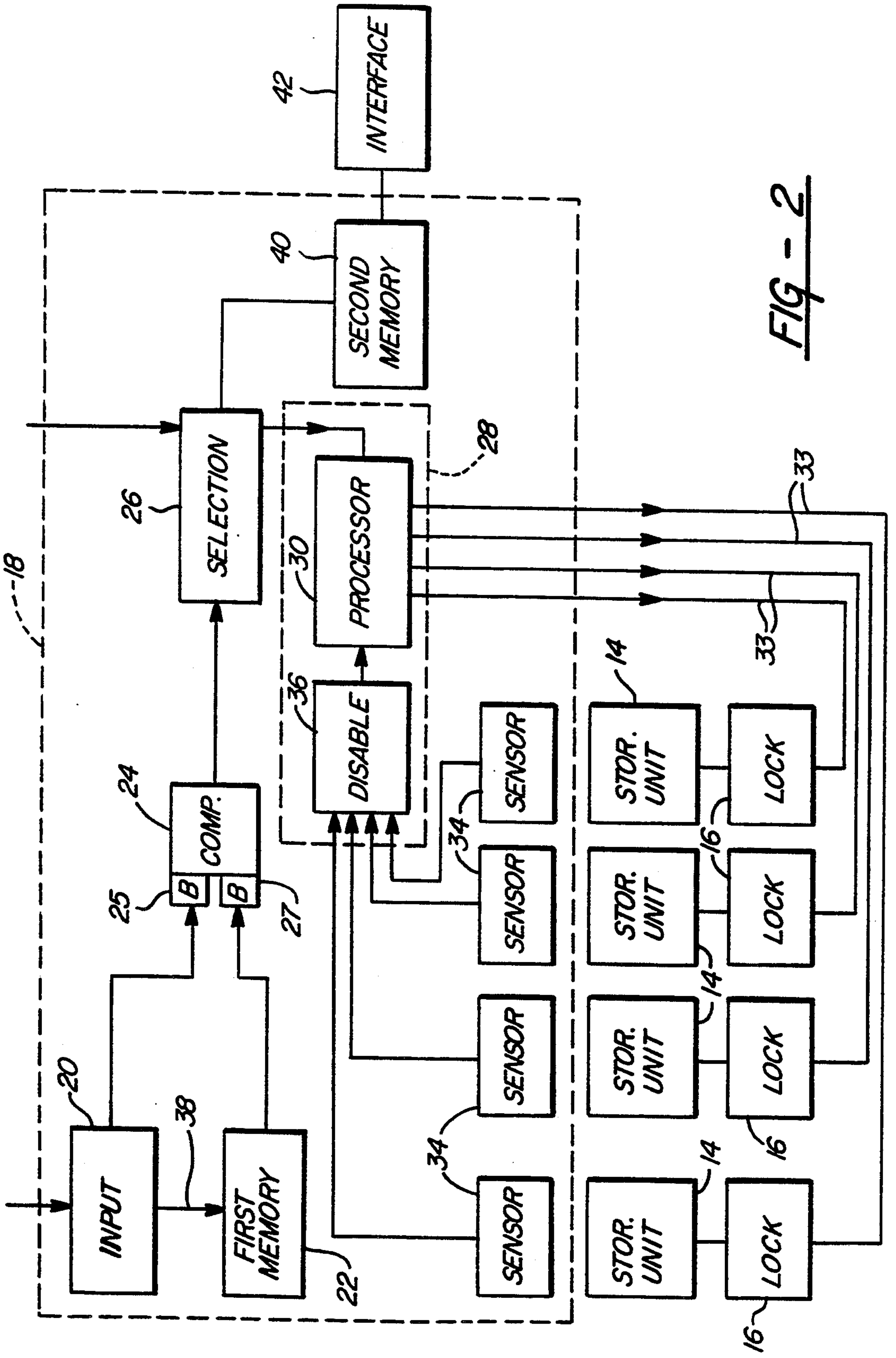
FIG. 2 is a block diagram of the first embodiment of the control of the subject invention.

The processor means 30 may include a plurality of output ports, each one associated with one of the storage units 14, or may include a single serial port which is connected through a decoding comparison circuit at each storage unit 14 which compares the coded signal to its drawer number and upon a match, will allow opening of the storage unit 14. In the case of a plurality of output ports from the processor means 30, an energization signal will be sent only upon one of the output lines 33 which is indicated by the coded signal. In other words, if the coded signal indicates that unit #1 is selected, the processor means 30 will energize the output line which is connected to the locking means 16 and the storage unit 14 indicating unit #1. Upon opening of any of the storage units 14, its respective sensing means 34 is activated, thereby disabling the disabling means 36. It could be understood by someone skilled in the art that the functions disclosed herein may be applied to alternative off-the-shelf components which are commonly known in the art. The keypad 20, as illustrated in FIG. 1, includes any following key labels: L, A, 1, 2, 3, 4, and 5. The input code may be input by depressing the combination of the numbered keys, preferably a five digit code. This code will be placed in the input buffer 25. If it is desirable to input or change an access code, the program button 35 will be first depressed and thereupon a combination of the numbered keys 21 will be depressed indicating the new access code. Upon depression of the keys 21, the access code is stored in the first memory means 22. It should also be understood that all the functions of the control means 18, excluding the keyboard 20 and sensing means 34, may be alternatively implemented by a typical computer.

A second embodiment of the subject invention is illustrated in FIGS. 3–7. The second embodiment 100 functions similar as the first embodiment 10, however, the second embodiment 100 includes more sophisticated structures and functions.

Figure 3:
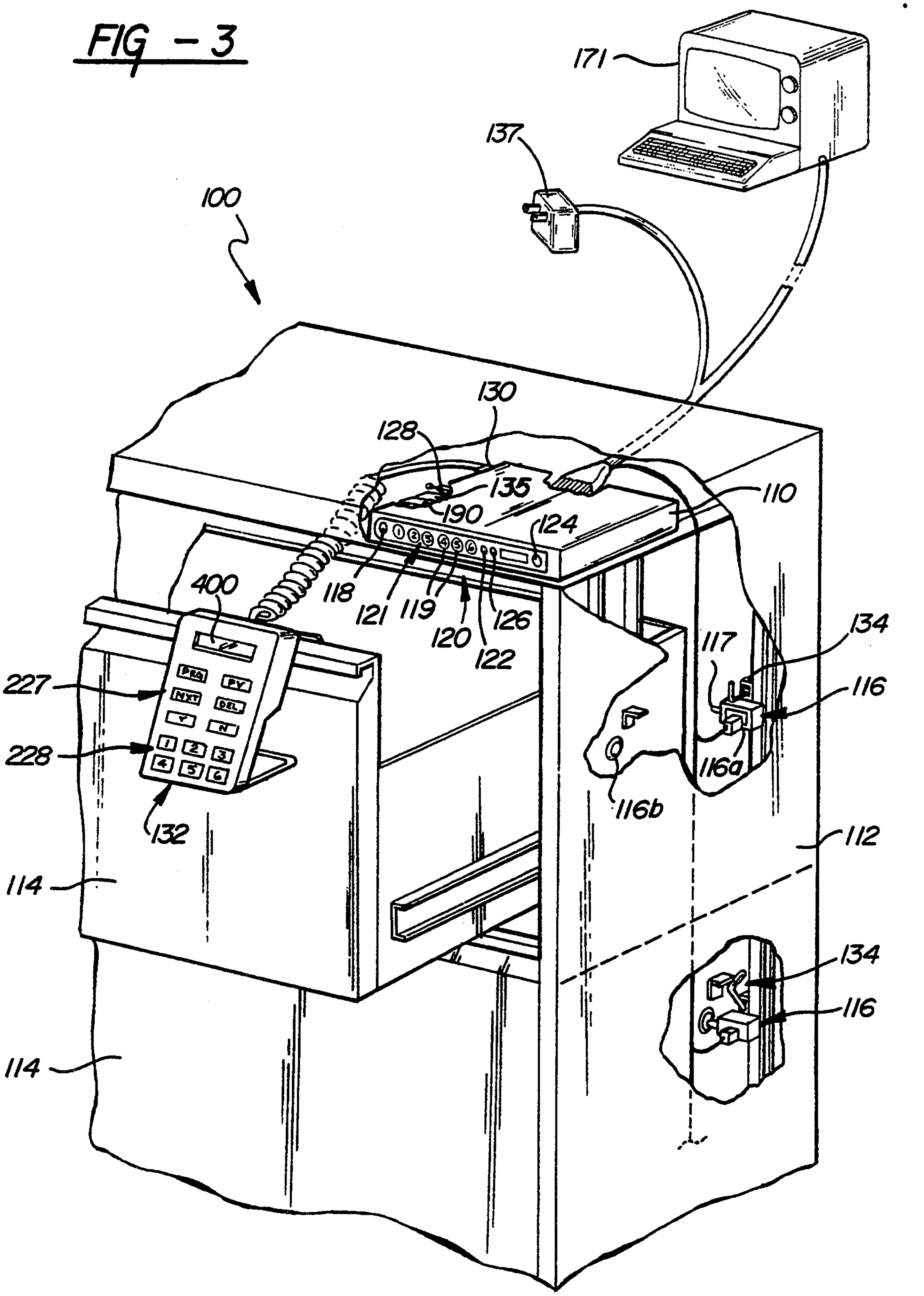
FIG. 3 is a perspective view partially cutaway of a second embodiment of the subject invention.

FIG. 3 illustrates a perspective view of the second embodiment 100. The storage assembly 100 of the second embodiment includes input means 120, locking means 116, interface 142, control means 110, housing 112, sensing means 134, and a storage units 114 similar to the first embodiment 10. The control means 110 decodes the entered input code and grants or denies access to the storage unit 114 according to the validity of the code. The input means 120 includes a keypad 121 and an indicator panel 117. The keypad 121 includes six depressible keys 119 numbered 1, 2, 3, 4, 5, 6. The six numbered keys 119 are utilized for the input of input codes and access codes, and for the selection of a storage unit 114. A colored key 118, such as a green color, allows for initial set-up and access coding of the control means 110. A light 122, generally green in color, is included on the indicator panel 117 and indicates that access has been checked and authorized, and that selection of the particular storage unit 114 is now required. Also included on the keypad 121 is a red colored key 124. The red key 124 is depressed to manually lock the storage units 114. Also included is a power supply terminal 126 for receiving a temporary or emergency battery power supply. The housing 112 includes a reset button 128 located in a generally obscure area of the housing 112. The reset button 128 may be depressed in order to reprogram the access code when only one access code is utilized. The input means 120 includes a programming port 130 adapted to be attached to a remote programming means 132 which is capable of setting a plurality of access codes when a plurality of access codes are utilized. Lastly, the housing 112 includes timing means 135 accessible to the user for setting the time delay, if any, of which to allow unlocking of the assembly 100 after authorization in the input code without the necessity of re-inputting the input code.

Figure 4:
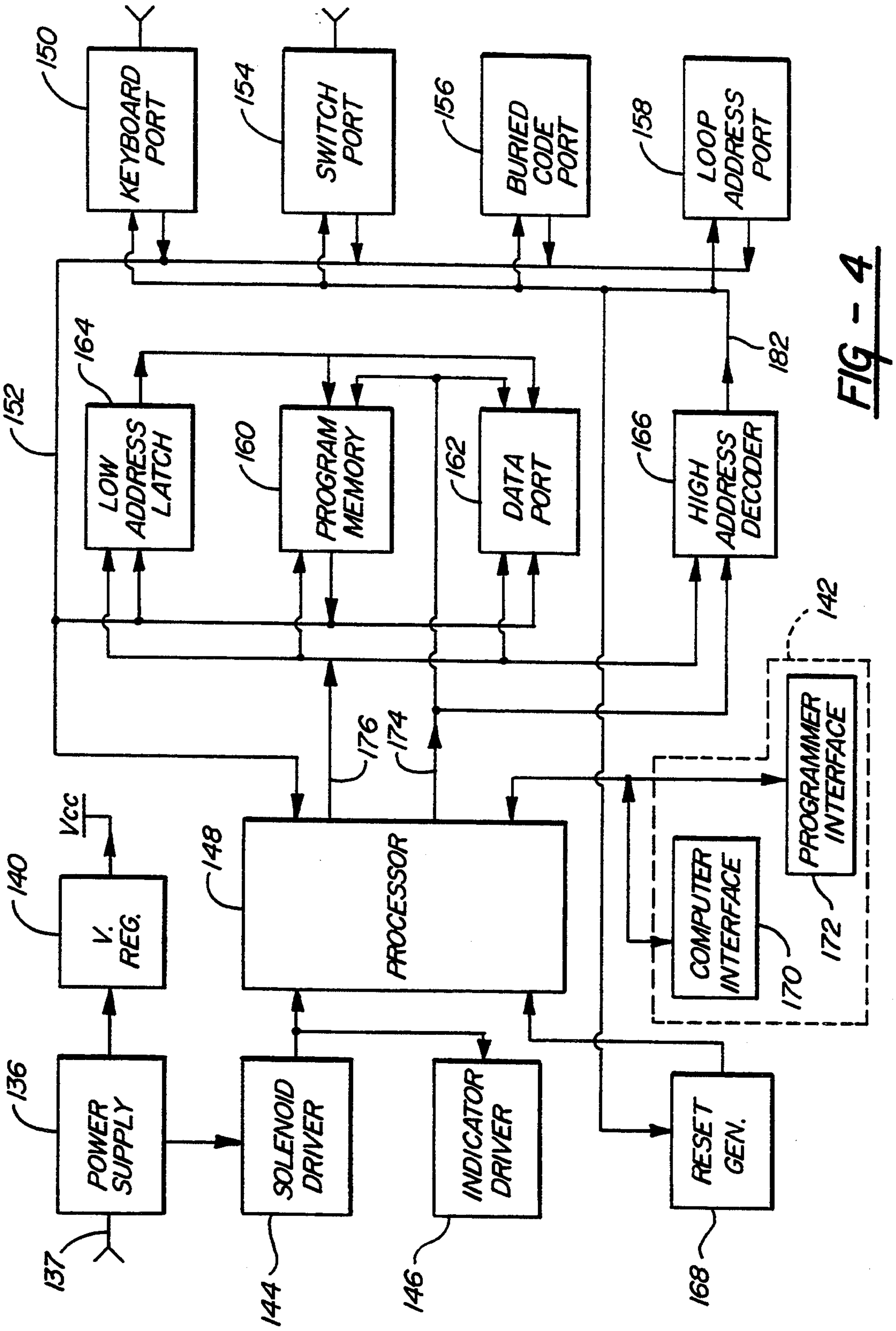
FIG. 4 is a block diagram of control means of the second embodiment.

As best illustrated in FIG. 4, the control means 110 includes a power supply 136 which is connected to AC line voltage via a line plug or hard wire connection 137. A 12 volt AC converter power supply may be connected directly to a wall outlet and to the cable/plug 137 with a two conductor cable and miniature plug. This is used for a single stand alone storage assembly 100 or cabinet of storage units 114. A higher current power supply is utilized for a bank of up to five storage assemblies 100. This high current supply may reside below the housing 112 and connects to a main harness assembly. The supply also supplies a nominal 12 volt DC. The power supply 136 is connected to the remainder of the control means 110 wherein a nominal 12 volt DC is delivered.

A step down voltage regulator 140 is connected to the power supply 136 and is comprised of a LM7805 integrated circuit and appropriate decoupling capacitors. The voltage regulator 140 delivers five volts DC to the other portions of the control means 110.

Also included is solenoid driver means 144 connected to the power supply 136. The solenoid driver means 144 is responsive to the control means 110 to actuate one of the locking means 116 for allowing opening of the selected storage unit 114. Indicator driver means 146 is also connected to power and responsive to the control means 110 to actuate the green light 122 and provide audio indication for indicating the authorized access to the selected storage unit 114 or disallowance thereof.

The control means 110 includes processor means 148 which receives inputs of codes and storage unit selection numbers and authorizes opening of a particular storage unit 114. The processor means 148 is connected to and controls the solenoid driver means 144 and the indicator driver means 146.

The keyboard 121 is connected to input port means 150 which receives the coding of the keys 116 depressed and transmits an 8-bit data signal indicative of such actuation to the processor means 148 via a data bus 152. Each of the sensing means 134 are connected to switch port means 154 which monitors the sensing means 134 and transmits a code or disable/enable signal indicative of status thereof to the processor means 148 also via the data bus 152. The switch port means 154 is also connected to the reset button 128 and the timing means 135 wherein the code transmitted by the switch port means 154 includes the status of the reset button 128 and timing means 135. Also included is coding port means 156 for providing a key code for the storage assembly 100 which may also be used as an access code. Loop address port means 158 identifies which storage assembly 100 of several on a network is transmitting data when several are utilized with the same external computer or to identify if communication is requested with the particular storage assembly 100.

The processor means 148 is connected to program memory 160, data memory 162, low address latch 164 and high address decoder 166. The program memory 160 stores the operating program code for the processor means 148. The data memory 162 stores the access codes and the unit assignment number 114, and information regarding the history of accessing the storage assembly 100. The low address latch 164 provides the lower address byte and the high address decoder 166 provides the higher addressing byte for addressing the program 160 and data memory 162 and ports 150, 154, 156, 158. The low order address is demultiplexed from the data bus 152 by the low address latch 164. The high address decoder 166 decodes the high order address from an address bus 174 connected to the processor means 148. A control signal line 176 is connected to and provides control signals to the low address latch 164, program memory 160, data memory 162, and high address decoder 166.

The processor means 148 is also connected to reset generation means 168 and interface means 142 comprising, computer interface means 170 and programmer interface means 172. The reset generation means 168 holds the control means 110 in a reset condition during power-up and also disables the processor means 148 with a reset if the input voltage falls below a predetermined level to prevent erroneous data from being written into the data memory 162 during power-up and power-down. Additionally, the reset generation means 168 will reset the processor means 148 during error interruption thereof. The computer interface means 170 allows the processor means 148 to communicate with a personal computer. The programmer interface means 172 allows the processor means 148 to be programmed and deprogrammed with access codes by the remote programming means 132.

Figure 5A:
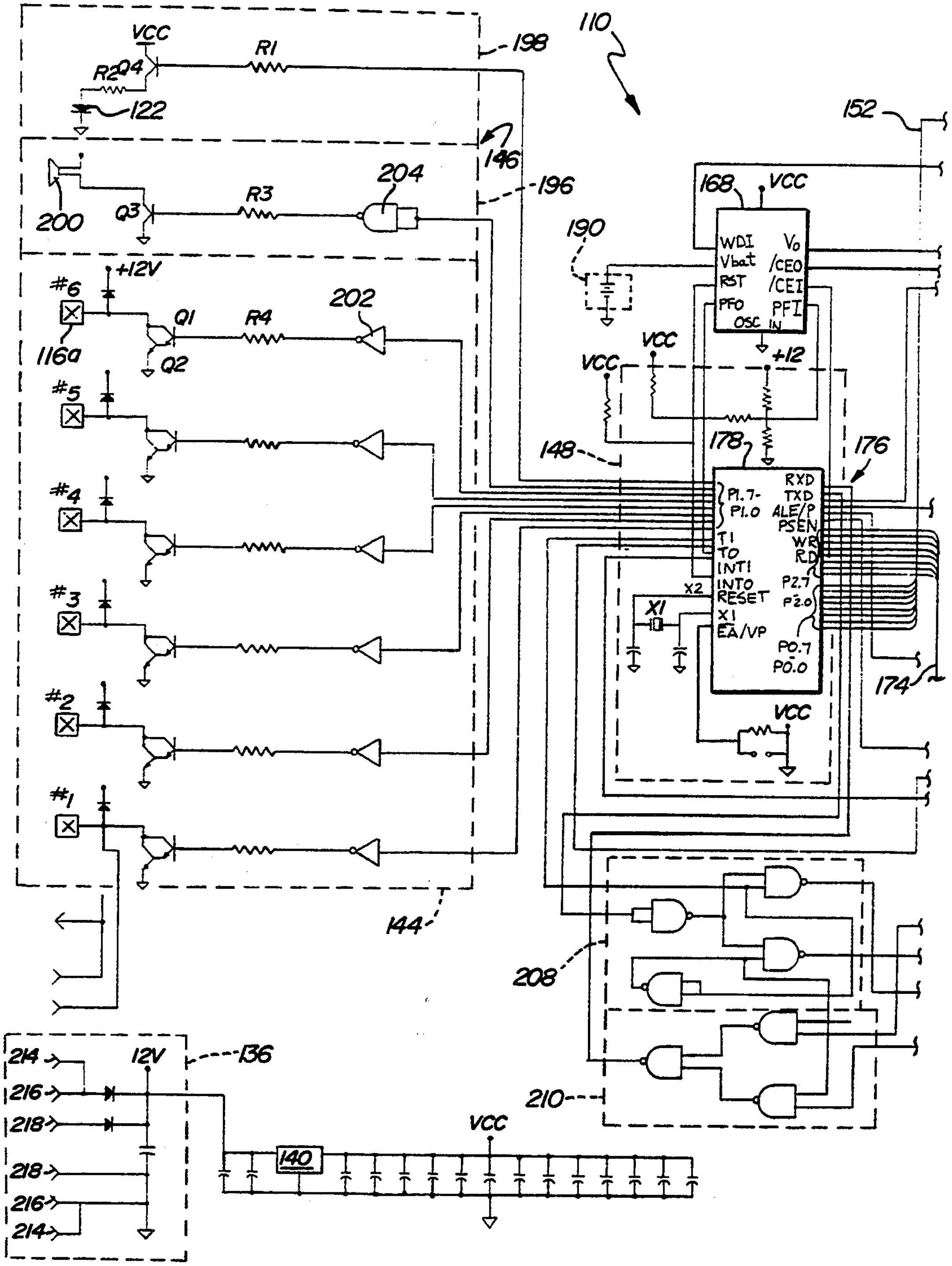
FIGS. 5A and 5B are a circuit diagram of the control means of the second embodiment.
Figure 5B:
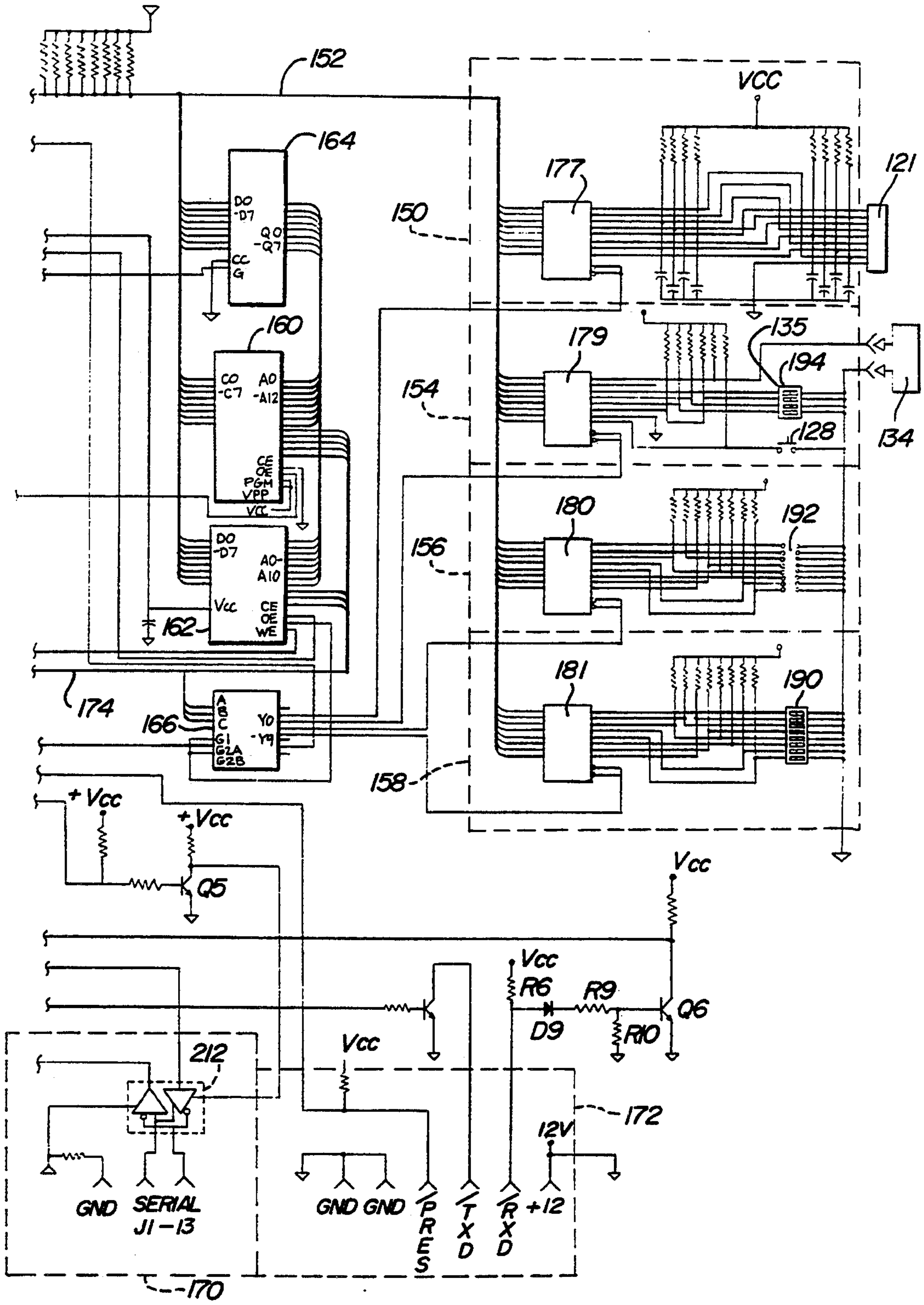
Figure 6A:
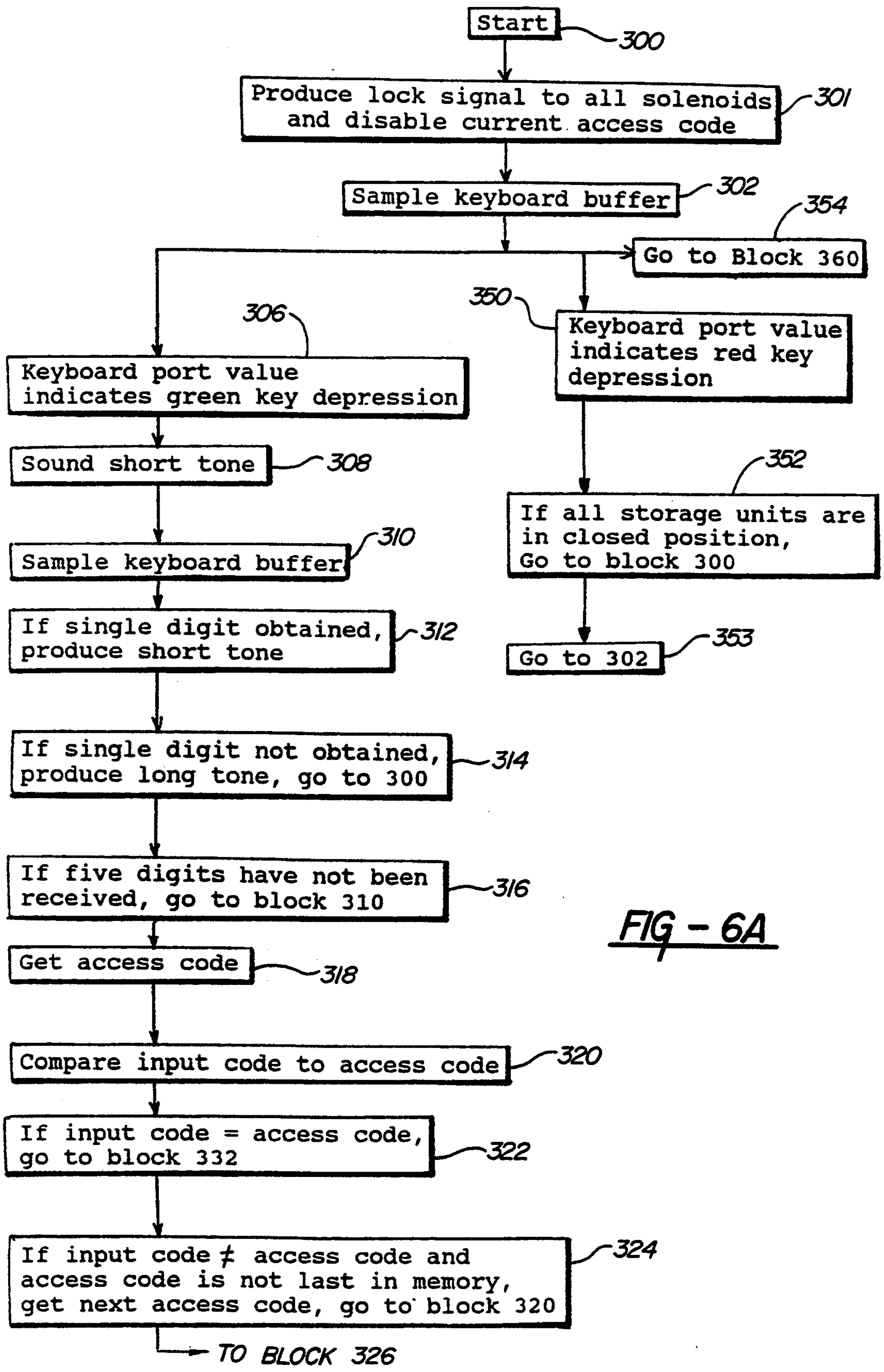
FIGS. 6A, 6B, 6C, 6D, 7A, and 7B are flow charts of the control means of the second embodiment.
Figure 6B:
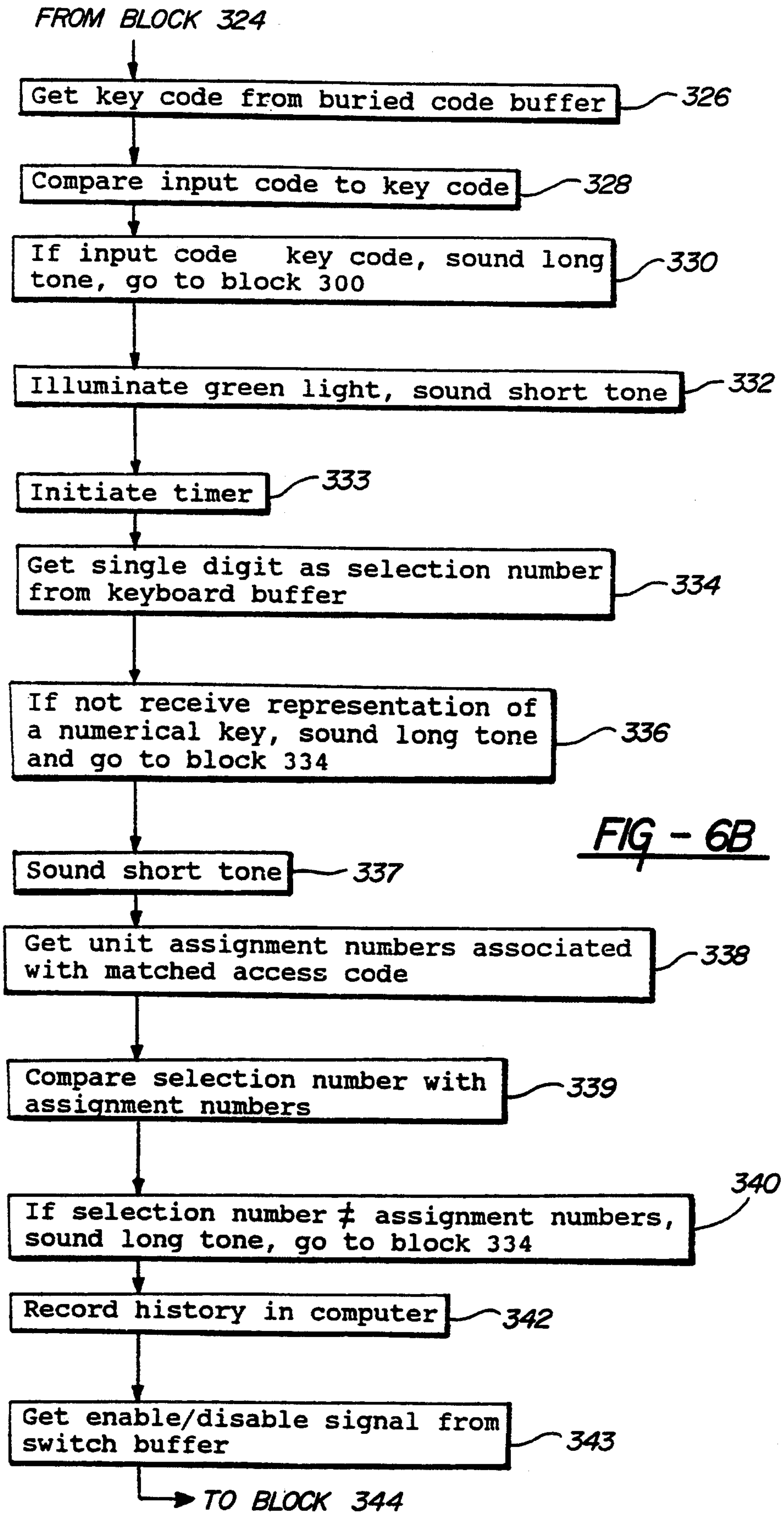
Figure 6C:
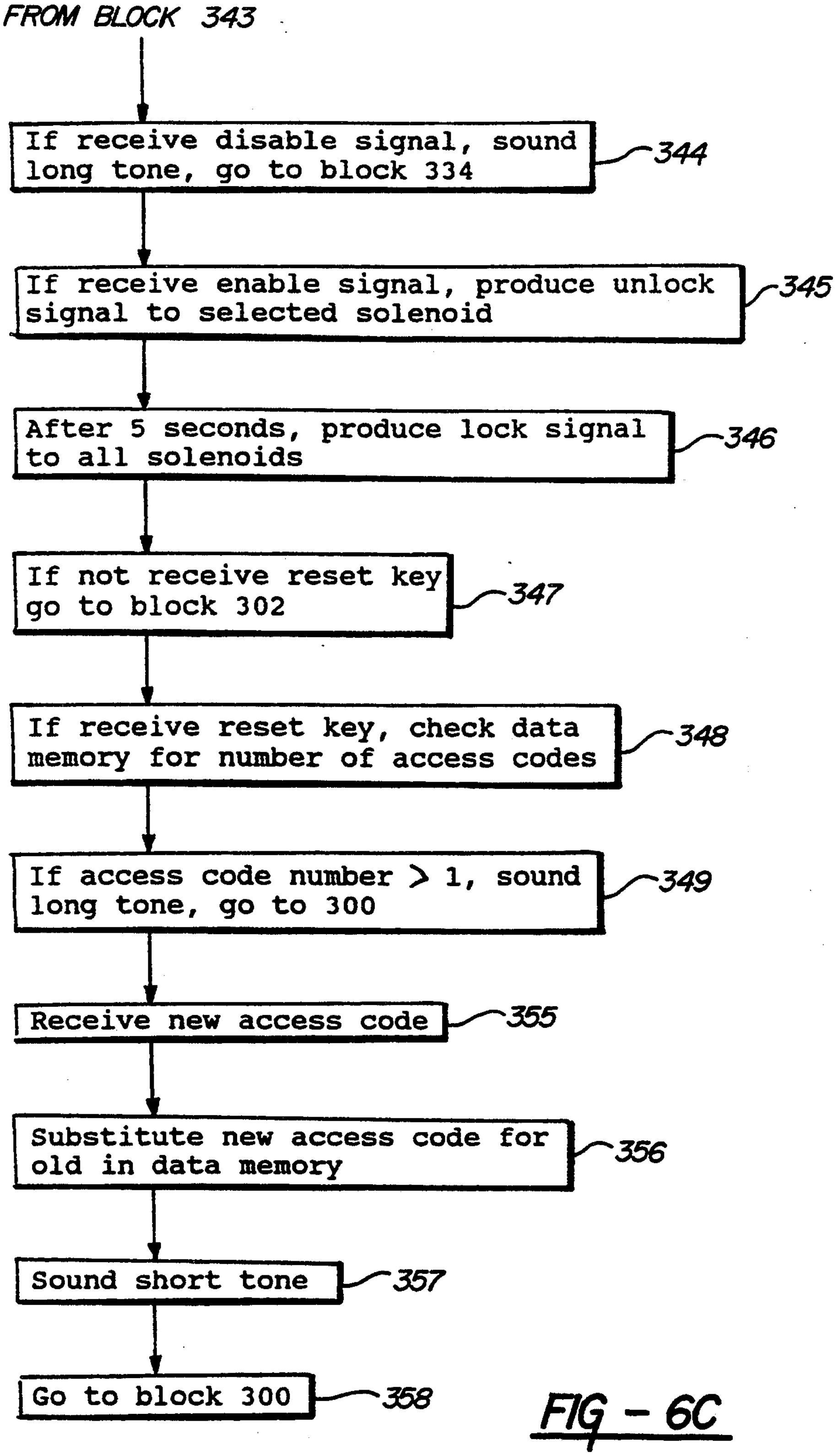
Figure 6D:
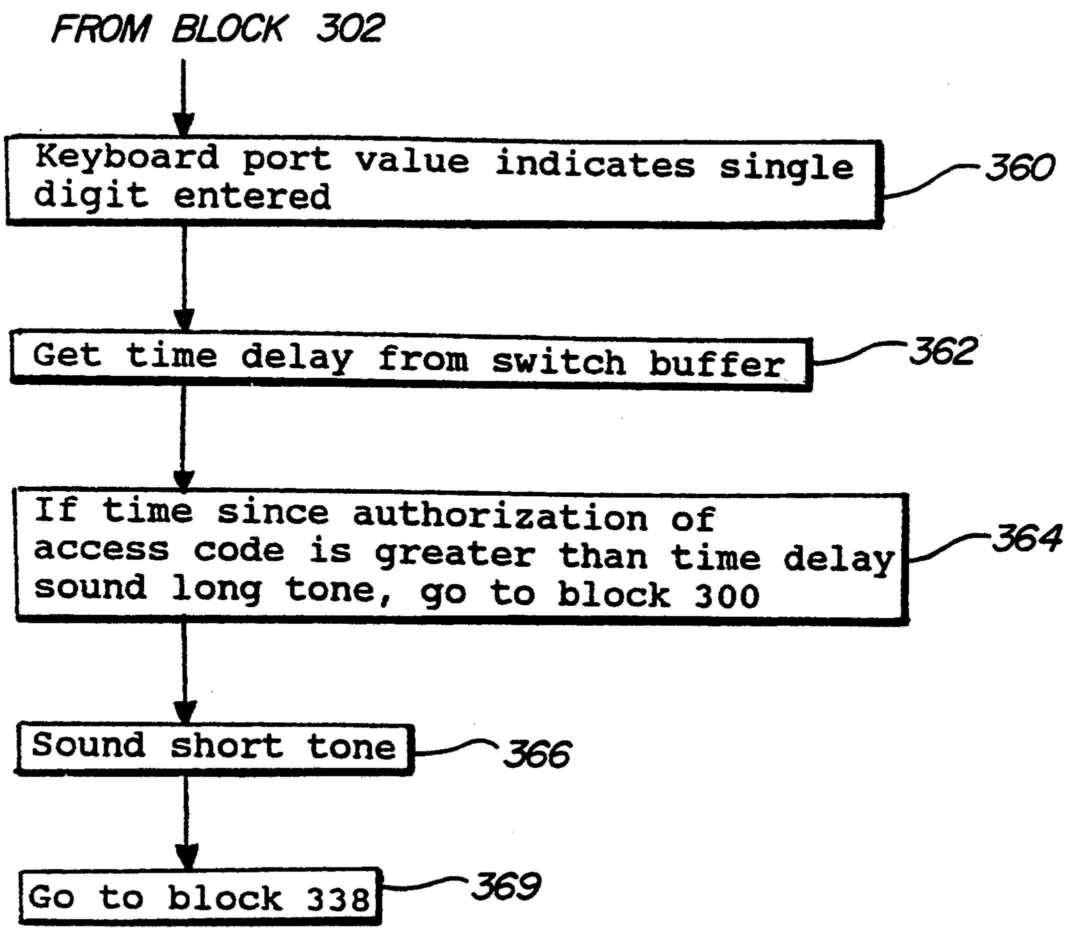

The more specific circuitry is illustrated in FIG. 5. The processor means 148 includes a processor unit 178 comprising an 8 bit CMOS micro controller (Intel 80C31). The processor unit 178 is used in the external addressing mode to read its operating microcode from program memory 160, store and retrieve data in external data memory 162, and control the four 8-bit input port means 150, 154, 156, 158. The data bus 152 interconnects each of the above. The port means 150, 154, 156, 158 include four separate 8-bit three state buffers (74HC244) 177, 179, 180, 181 plus external circuitry. When enabled, these buffers 177, 179, 180, 181 place the contents of their input onto the 8-bit data bus 152. The low order 8-bit address is demultiplexed from the data bus 152 by the lower address latch 164, comprising an 8-bit latch (74HC373). The latch 164 stores the address that is present on the data bus 152 during the first portion of the instruction cycle on the falling edge of the address latch enable (ALE) control signal 176. This latched address is delivered to the program memory 160 and the data memory 162. The high order address bus 174 is output directly from the processor unit 178 and delivered to the program memory 160, the data memory 162, and the high address decoder 166. The high address decoder 166 decodes the high order address along with the data read control signal 176 from the processor unit 178 and delivers a dedicated read signal 182 to each of the four 8 bit buffers 177, 179, 180, 181. The dedicated read signal 182 is also delivered to the reset generation means 168 to continually reset the reset generation means 168.

The processor unit 178 receives the program code from the data contained in the program memory 160, which memory 160 is a typical EPROM (27C64).

The EPROM 160 is read when the processor unit 178 brings the /PSEN (program store enable) line low. This enables the/OE pin (output enable) of the EPROM 160 and places data on the data bus 152. The address decoding is handled by the high address decoder means 166 (74HC138). The address decoder 166 is a demultiplexer which decodes the upper address bytes of the address bus 174 and "ORs" the read line 182 with the address to control the buffers 177, 179, 180, 181.

The processor unit 178 clock is controlled by crystal X1. This crystal X1 oscillates at 11 MHz and is divided by 12, by the processor unit 178, to produce a system clock period of 1.09 microseconds.

Access codes and unit assignment numbers associated with each access code are stored in the external data memory 162. This memory 162 is a 2K×8 static RAM. This RAM 162 is battery backed by batteries 190. This RAM 162 is a CMOS memory (6116). The data memory 162 includes access memory 240 for storing access codes, assignment memory 241 for storing storage unit numbers associated with each access for which access may be allowed.

The reset generation means 168 includes a system reset which will hold the control means 110 in a reset condition during power up, and disable the control means 110 with reset if the input voltage falls below a predetermined level. This prevents erroneous data from being written into the data memory 162 during system power up and down. The reset generation means 168 also contains a watch dog timer. During proper operation of the control means 110 this watch dog timer 188 is continuously reset with a read signal. If for some reason the processor unit 178 program loses its place, this read signal will not occur at a regular interval and the watch dog timer will reset the control means 110 to normal operation. The reset generation means 168 also included power monitoring for performing the battery backup functions for the data memory 162. The power monitoring will monitor the voltage to the processor unit 178 and will switch to the battery 190 when the voltage falls below a predetermined limit.

The system generation means 168 comprises a processor supervisory chip 184 (MAX691). The supervisory chip 184 contains internal timers that generate system reset time out and watch dog timer time outs. These timers are set to supply a 50 millisecond reset pulse on power up of the control means 110 and generate a reset 100 milliseconds after the last watch dog reset interrupt. The watch dog timer is used to insure that the processor unit 178 system remains on line and functioning. If, for some reason, the processor unit 178 were to be lost in the execution of the program code or quit issuing regular watch dog reset interrupts, the watch dog timer would time out and reset the system to proper operation. When the system power is first turned on to the control means 110, the reset output of the supervisory chip 184 (RST) is held high for 50 milliseconds to reset the control means 110. The watch dog timer will not issue its reset pulse for 1.6 seconds after initial turn on of the control means 110. This is to allow the software to initialize. Before 1.6 seconds has lapsed, the watch dog timer must be interrupted with a watch dog reset interrupt or the control means 110 will reset from start again. After the first watch dog reset interrupt has been issued, each watch dog reset interrupt must be issued at least every 100 milliseconds or the timing chip 184 will reset the control means 110. The processor unit 178 outputs a watch dog interrupt every few milliseconds from the high order address decoder means 166. This assures that the watch dog timer will not reset the control means 110 during operation. The signal can be seen as a /RD pulse on the input of the timing chip 184 and is a good indication that the control means 110 is functioning properly. The supervisory chip 184 also performs battery back-up functions by the power monitoring means. Pin labeled PFI is the power fail input. This PFI input monitors the positive DC voltage supplied to the voltage regulator 140 through a resistor divider and indicates to the processor unit 178 that power is on its way down by raising its power fail output labeled PFO. The processor unit 178 receives the signal on its interrupt input INT1. When the processor unit 178 sees this INT1 go high, it immediately holds all operations and waits for power to fail. The supervisory chip 188 also "gates" off the chip select line /CEO to the RAM or data memory 162. This prevents the writing of erroneous data into the RAM 162 during power down. Battery power back-up by battery 190 is the provided through the supervisory chip 188 to the RAM 162.

The loop address port means 158 also includes eight dip switches 190 which are manually set to establish a loop address. The coding of the loop address selects identifies the particular storage assembly 100 for communication purposes. During communication request, the loop address is read to determine if the communication request is directed toward that particular storage assembly 100. The loop address is read by reading address 8000H. This address enables the loop address selector 1G, 2G of the loop address buffer 181 and places the packed BCD equivalent of the loop address on the data bus 152.

The coding port means 156 includes eight jumpers 192 which may be cut in any combination to set a buried code. The buried code is related to the serial number of the storage assembly 100. The buried code establishes a key code which acts as an access code when all access codes in the data memory 162 have been compared with no match. If the input code matches the key code, any storage unit 114 assigned unit number one may be opened. The buried code program jumper port buffer 180 is read by reading address 6000H. This address enables the buried code program jumpers and places the buried code value or key code on the data bus 152.

The timing means 135, reset button 128, and sensing means 134 are read by reading address 4000H. This address enables the switch buffer 179 and places the value of the connections on the data bus 152. The reset button 128 is a standard momentary electrical contact switch which will set one bit of the 8-bit value code. The timing means 135 includes four dip switches 194 wherein the throwing of one of the switches 194 indicates a predetermined time delay and will represent four bits of the value code. The sensing means 134 is comprised of interlock switches, one each associated with each storage unit 114 as discussed with respect to the first embodiment. The interlock switches or sensing means 134 may comprise a magnetic switch, contact switch, etc. which may indicate when a storage unit 114 is in the closed position and when not in the closed position. The indication of any one opening of a storage unit 114 provides a high signal on the 1A1 input of buffer 179.

The front panel keypad 121 is read by reading address 2000H. This address enables the keypad input port buffer 177 and places the value of the keys 119 depressed from the front panel keypad 121 on the data bus 152. The keypad 121 includes the numbered keys 119, green key 118, and the red key 124.

The locking means 116 are driven by the solenoid driver means 144. The solenoid driver means 144 switches the nominal twelve volt DC power with Darlington transistors Q1, Q2 to drive the respective solenoid 116. The locking means 116 includes a solenoid **116*a* responsive to the solenoid driver means 144, which in turn operates a plunger 117. The plunger 117 is biased by spring 116*c* to the extended position for engagement with a locking emboss 116*b* on the storage unit 114 which is closed. Activation of the solenoid 116*a* causes the plunger 117 to retract releasing the emboss 116*b* and therefore respective storage unit 114. The emboss 116*b* is generally conical with a center hole for receiving the plunger 117**.

The indicator driver means 146 includes audible means 196 and visual means 198. The audible means 196 is driven by switching the nominal 12 volt DC by a transistor Q3 to a transducer 200. The visual means 198 includes switching the five volt DC power supply with a small signal transistor Q4 to operate the green light 122, which is comprised of an LED. These transistors Q1–Q4 are controlled directly from the 8-bit output ports P1.0–P1.7 of the processor unit 178.

Output port P1.7 of the processor unit 178 drives the green light 122. Port P1.7 is connected through a resistor R1 to drive a switching transistor Q1 to a resistor R2 driving the green LED 22. Port P1.6 is inverted by a dual input NAND gate 204 to a resistor R3 driving transistor Q3 which drives the audio transducer 200 with its collector. Each of the following ports P1.5 through P1.0 are connected to the solenoids 116 of storage units 114. Each of the driving circuits are the same and therefore one will be described. The output of the ports P1.0–1.5 are connected through an inverter 202 to a resistor R4 which drives the Darlington transistor pair Q1, Q2 to in turn drive the solenoids 116. The power supply terminal 126 receives a 12 volt battery supply to directly power the solenoids **116*b* to allow opening of any or all of the storage units 114 in the case of an emergency. The six solenoids 116*b* are activated by writing a low out of one of the ports P1.0–P1.5. These lows are inverted to prevent the solenoids 116 from activating when the processor unit 178 goes to reset. The ports will tristate and will pull high when the processor unit 178** is reset.

The control means 110 can also communicate with a personal computer 171. This is accomplished with the computer interface means 170. The computer interface means 170 converts the TTL level signals from the processor unit 178 to EIA-485 RS-485 standard signals for data integrity over long data cable runs to the computer 171. The computer 171 communicates through the processor unit 178 to obtain information stored in the data memory 162.

The control means 110 can communicate with the remote programming means 132 which is an external hand held programmer. This hand-held programmer 132 interfaces through the programmer interface means 172 to the processor unit 178. The programmer interface means 172 controls the flow of data between the processor unit 178 and the communications interface 172 and buffers the transmitted and received data from and to the processor unit 178 for data integrity.

The processor unit 278 contains a UART for self contained serial communications. Transmitted data is transmitted from port TXD and receive data is received at port RXD of the microprocessor 178. Serial communication link used for the computer interface 170 is the RS-485 standard. This link allows half duplex communications to occur with up to one hundred storage assemblies 100 (each identified by the loop address) on link of up to five thousand feet. Serial communications to and from the processor unit 178 can be directed to one of two devices, either the computer interface 170 or the programmer interface 172. The serial communication is performed by the first set of AND gates 208 and a second set of AND gates 210. The microprocessor 178 determines which device (i.e., computer or remote programmer) is to be communicated with and selects the device with its output pin T1. Upon sensing an interrupt on line RXD, the processor unit 178 first switches communications to the computer interface 170 and awaits communication. If no communication is received within a preset time of five minutes, the processor unit 178 switches the communication to the programmer interface 172. The sets of AND gates 208, 210 are configured as a data selector and routes the processor unit's 178 transmitted data to the devices 171, 132 selected and at the same time routes the selected receive data back to itself. A RS-485 transceiver 212 interfaces TTL logic to a RS-485 communications loop. The transmitted data from the communications data selector is routed into pin 4 of the transceiver 212. This zero to five volts signal is then converted to a differential signal and placed on the communication loop. Pin 3 of the transceiver 212 is the transmit enable pin. The transceiver 212 will only transmit onto the communications loop if the pin is at least a logic one. Transistor Q5 is used as an inverter to invert the logic level of the signal. The reasoning behind this is that when the processor unit 178 is in the reset condition, the level of the input port will be logic 1. This level would enable the RS-485 transceiver 212 and keep it on the communications loop as long as the processor unit 178 was in the reset condition. To provide for fail safe operation, the signal is inverted to disable the RS-485 transceiver 212 anytime the processor unit 178 is in reset.

The transistor Q6 is used as the serial input buffer. The open collector serial driver on the remote programmer 132 will transmit data by sinking current through resistor R6. This will pull the anode of diode D9 low. Because of the noise induced by and the resistive nature of the six conductor coiled phone cord between the control means 110 and the remote programmer 132, this low can not be guaranteed a logic zero. Diode D9 is used to add a 0.7 volt threshold to the base-emitter junction of transistor Q10. Now any serial input signal less than 1.4 volts will be recognized as a logic zero and turn off Q10. Resistor R9 is the base bias resistor for transistor Q10 and resistor R10 is used to ensure the turn off of the transistor Q10 when diode D9 is conducting with a low level input signal.

The power supply 136 includes three pairs of inputs: multiunit power connectors 214, single unit power connectors 216, and emergency power connectors 218. The input to the multiunit power connectors 214 receive input from an external power means which is a 5.5 ampere power supply at 12 volts. If a one ampere supply is used at 12 volts, power enters the single unit power connectors 216. Emergency power is supplied by a twelve volt battery pack (not shown) at emergency power connectors 218. Each of the power connectors 214, 216, 218 are isolated by diodes D7, D8 for safety. The signal from the diodes D7, D8 are connected together and regulated by the voltage regulator 140 (LM7805). The input of the regulator 140 is filtered by a 1000 uF electrolytic capacitor C29 for further ripple filtering when this unit is used with the one ampere power connectors 216. The voltage regulator 140 is decoupled with 0.1 uF and 10 uF capacitors. After this voltage is regulated, it is distributed to the control means 110 and decoupled at each circuit chip with a 0.1 uF capacitor.

General operation will be first explained. When pressing the keys 116, 118, 119, 124, a short tone indicates that the entry is acceptable, and a long tone indicates that the entry is unacceptable. Therefore, a long tone will occur upon depressing keys 116, 118, 124 out of sequence or incorrect key depression. With regard to opening storage units 114, new storage assemblies 100 are provided with a predetermined access code. The green key 18 on the keypad 121 is first depressed. The processor unit 178 receives a data signal indicative of green key 118 depression. After pressing the green key 118, the input code equal to the access code are sequentially pressed on the keypad 121. The access code is prestored in RAM 162 within each new storage assembly and provided in literature thereof. The value of the matrix keypad 121 is received having the input code equal to the access code. The processor unit 178 compares the input code to the stored access codes in RAM 162, and energizes the green light 122 if a valid comparison is made. When the green light 122 comes on and there is a short audible tone, the storage assembly 100 is accessible. The storage units 114 can be identified and opened. If the green light 122 does not come on, or if you hear a long tone, one must press the green key 118 and start the sequence again. With regard to opening a storage unit 114, once the green light 122 is on, the user presses the keypad 121 number that identifies the storage unit 114 which the operator desires to open. For example, if the number two key 119 is depressed, the second storage unit 114 from the top of the storage assembly 100 will be allowed to be opened. The operator will have five seconds to pull the storage unit 114 open before the control means 110 locks the storage unit 114. If the access code does not have access to the selected storage unit 114, a long tone will be heard.

A storage unit 114 may be locked manually or automatically. To lock the storage unit 114 manually, the red key 124 is depressed. The timing means 135 is not activated in new storage units 114. For added security, the timing means 135 is activated and set to lock the storage assembly 100 automatically. To change the delay established by the timing means 135, an input code equal to the access code is entered and the top or first storage unit 114 is opened and removed. Inside the housing means 112 is the timing means 135 comprising the dip switches 194 and timer module 222 which sets the time delays. The program code in conjunction with the processor unit 178 establishes the time delays based upon which switch 194 is closed. There are four dip switches 192 which are initially in the open or down position. In order to set the timing means 135, one of the switches 194 will be switched to the upper or closed position. One switch 194 will establish an immediate deactivation, a second switch 194 will establish a delay of ten minutes, a third switch 194 will establish a delay of one hour, and a fourth switch 194 will establish eight hour deactivation. It is to be understood that the time delays may be varied dependent upon operation thereof. For the ultimate security, the first switch 194 is closed wherein the storage assembly 100 will immediately lock when an open storage unit 114 is closed. This mode requires the users to enter an input code equal to the access code for each storage unit 114 opening. The other switches 194 allow a time delay before automatic locking. Upon closure of an opened storage unit 114, another storage unit number may be selected on the keypad 121 and the storage unit 114 opened within the 5 seconds. The step of inputting a code is deleted until the time delay set by the timing means 135 has expired. After setting the switches 194, the top storage unit 114 is replaced and the timer means 135 is set.

With regard to setting a new access code, two configurations are available. A first configuration allows for the use of a single access code per storage assembly 100. A second configuration allows for multiple access codes. The multiple access codes programming is the subject of U.S. Pat. No. 5,206,637 and will be generally described subsequently. In the first configuration, in order to reset the access code stored in RAM 162, the present access code is entered on the keypad 121 and a storage unit 114 is opened. Thereafter, the reset button 128 is depressed. The reset button 128 is located within the housing 112 above the top or first storage unit 114, therefore the top storage unit 114 requires prior opening. The new access code is entered on the keypad 116. When the storage unit 14 is closed, the storage assembly 100 is locked and will only open upon input of an input code equal to the new access code.

With regard to the operation, the microprocessor 178 in conjunction with the code stored in the program memory 160 produces the means by which the assembly 100 is controlled. The flow chart of general operation is illustrated in FIGS. **6*a*–6*d* and will be described herein. The processor unit 178 starts at block 300, and continuously samples the input from the keypad input port 177 as indicated at block 302. Interruption by the communication interfaces 170, 172 at pin RXD may occur at any time which switches to the control of block 370. The processor unit 178 upon reception of a value on the keyboard buffer 177 determines which key 119, 118, 124 is depressed at block 304. Upon a green key 118 depression, the keyboard input port 150 will place a value on this key 118. The processor unit 178 will sample the port 178 and provide the data over the data bus 152 to the processor unit 178. The processor unit 178 makes a comparison and if the value indicates green key 118 depression as in block 306, and a short tone is sounded by the audible transducer 196 indicated by block 308. The processor unit 178 again samples the keypad input port 178 indicated by block 310. If the red key 124 is depressed and determined by the processor unit 178 as in block 350, the processor unit 178 locks all the solenoids 116*a* as indicated by blocks 352 and 301. If the first depressed key is not the green key 118 nor the red key 124, block 360 is checked. If neither blocks 306, 350, 360 are valued, a long tone will occur and the processor unit 178 will restart its program to block 300**.

Assuming correct sequence depression of the green key 118, the processor 178 steps through and sequentially samples the input buffer 177 to obtain the five digit input code as indicated in blocks 310 through 316. Upon receiving each of the numbered key 119 depressions as a digit, a short tone will occur if one of the keys 0–6 has been depressed. If five numbered keys 119 are not sequentially depressed, a long tone will be sounded and the processor unit 178 will restart its program. After receiving all five digits of the input code, a first access code is obtained from the data memory 162 as indicated by block 318. The five digit input code is compared to the access code and if there is a match as indicated in blocks 320 and 322, a short tone is sounded and the green light 122 is illuminated by branching to block 332. If there is not a match, the next access code is obtained from the data memory 162 as set forth in block 324. The processor unit 178 continually steps through all of the available access codes from the data memory 162 until a match is obtained. If a match is not obtained after depletion of the access codes in the data memory 162, the processor unit 178 will sample the value on the buried code jumpers input buffer 180 to obtain the key code as set forth in blocks 326 and 328. If the input code matches the key code, access is authorized. If the input code does not match the key code, no green light 122 is illuminated and a long tone will be actuated on the audible transducer as in block 320.

Upon illumination of the green light 122 in block 332, a sixth digit is obtained from the keypad input buffer 178 which will indicate the selected storage unit 114 requested for opening indicated in block 334. If a numbered key 119 is not depressed, a long tone will occur and the processor unit 178 will restart its program as in block 336. If a numbered key 119 is depressed and received by the processor unit 178, a short tone will occur as indicated in block 337. The processor unit 178 thereafter obtains the unit assignment numbers associated with the matched access code in block 338. The processor unit 178 compares the selection number to the assignment numbers associated with the matched access code to ensure that the selected storage unit number is authorized for entry by that access code as indicated in block 334. If the selected storage unit is not authorized and there is no match with the assignment number in block 340, a long tone will occur and the processor unit 178 will restart. A timer will initiate counting in block 333. If the storage unit 114 is authorized, the processor unit 178 reads the data from the switch buffer 179 in block 343. This access may be recorded by the computer 171. If any of the interlock switches 134 are transmitting an open signal indicating that a storage unit 114 open, the disable signal in the form of code is transmitted to the processor unit 178 and the solenoid **116*a* of the selected storage unit 114 is not energized as indicated in block 344. If all of the interlock switches 134 are transmitting a close signal, an enable signal is transmitted to the processor unit 178 which supplies the unlock signal to the solenoid 116*a* associated with the selected storage unit 116*a* in block 345. After supplying the unlock signal for five seconds, the unlock signal is discontinued and a lock signal is transmitted in block 346. If the reset key 128 is depressed, the data memory 162 is checked to determine the number of access codes. Otherwise, the code goes to block 302. As indicated in block 349, if the access code number is greater than one, a long tone is sounded and the code branches to block 300. If there is only one access code, the new access code is received as indicated in blocks 355–358**.

The computer 171 in communication with the processor unit 178 stores the number of times an access code is utilized as the input code and the storage unit 114 opened. This data is updated during each use thereof. Also, any successful forced entries without an access code and opening of a storage unit 114 will be recorded. Such is stored during block 342. Upon each above access or attempt, the processor unit 178 places the information in an output buffer to be transmitted on the TXD line upon request by the computer 171. If the computer 171 polls the particular processor unit 178 identified by the identification code on the RXD line, this information is sent to the computer 171. Such information is lost if no polling occurs prior to a subsequent access or attempt wherein the subsequent information is written to the output buffer.

The processor unit 178 will thereafter again sample the keypad input port 150. Upon depression of a single numbered key 119 on the keyboard 121, processor unit 178 will read the digit value from the keypad input buffer 178 indicated at block 360. If a single digit is read, the processor unit 178 will sample the switch input port 154 to determine whether any storage units 114 remain open and also to determine whether the time delay setting 135 has expired. If the processor unit 178 receives the disable signal, a short tone is sounded and the program restarts. If the time delay has not expired, the processor unit 178 compares the selected storage unit number to the assignment numbers authorized by the original access code as indicated by blocks 362–366. If the selected storage unit number is authorized, and no other storage unit 114 has been opened indicated by an enable signal in blocks 343–345, the processor unit 178 will energize the solenoid 116*a* associated with the selected storage unit 114 for five seconds. If the time delay setting has expired, a long tone will sound which will indicate that an incorrect key sequence has been entered. If a red key 124 is depressed at any time and all storage units 114 are in the closed position, all solenoids 116*a* are automatically locked. If the reset key 128 is depressed after authorization of the input code with the access code and selection and opening of the first or top storage unit 114, a five digit code is sequentially read from the keyboard buffer 177. The processor unit 178 replaces this new code for the previously stored single access code. The reset key 128 can only be utilized if a single access code is stored. When the reset key 128 is depressed, the processor unit 178 checks the data memory 162 to determine if only one access code is stored. If more than one code exists, a long tone is produced and the program goes to block 300.

Figure 7A:
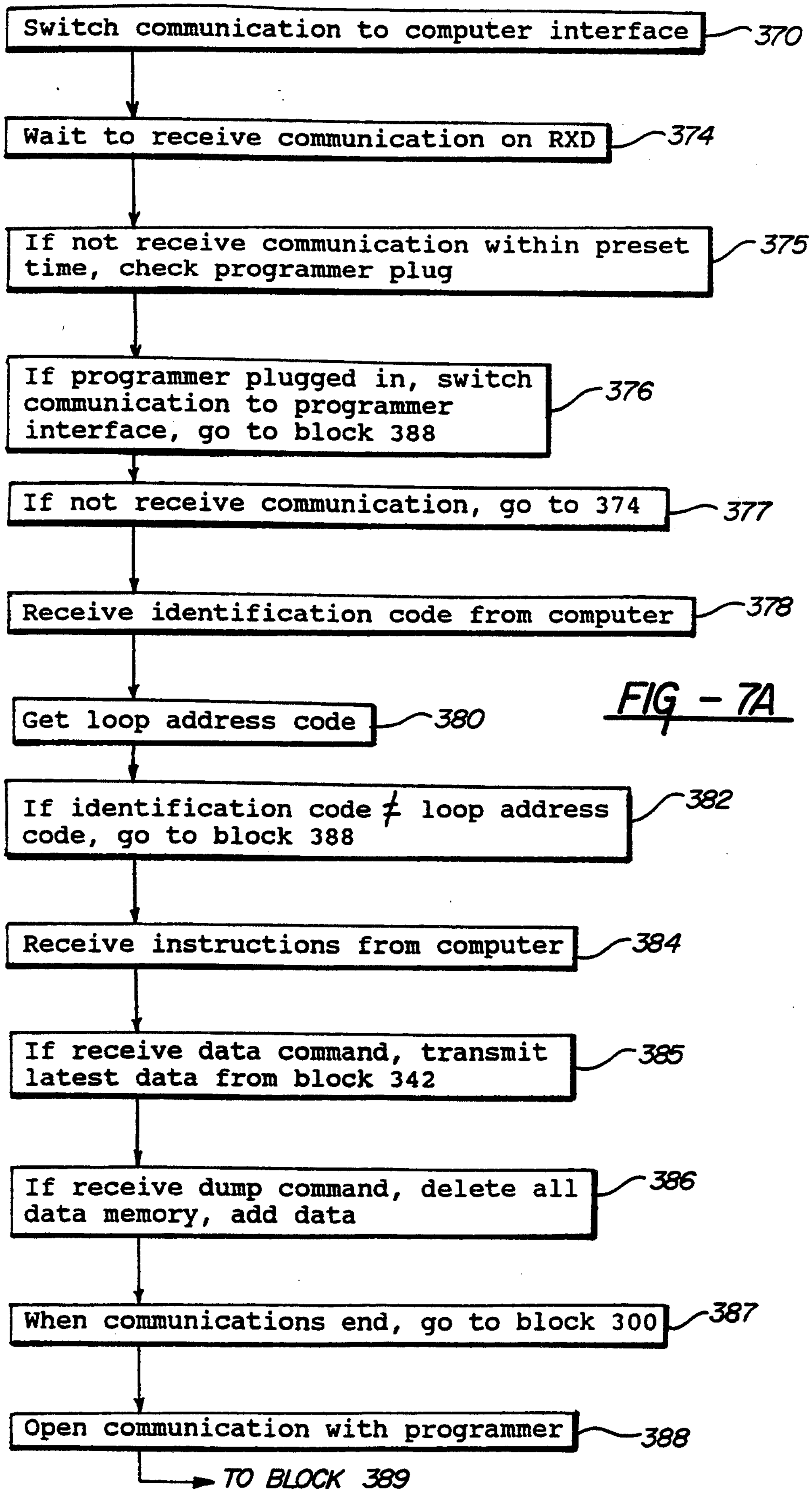
Figure 7B:
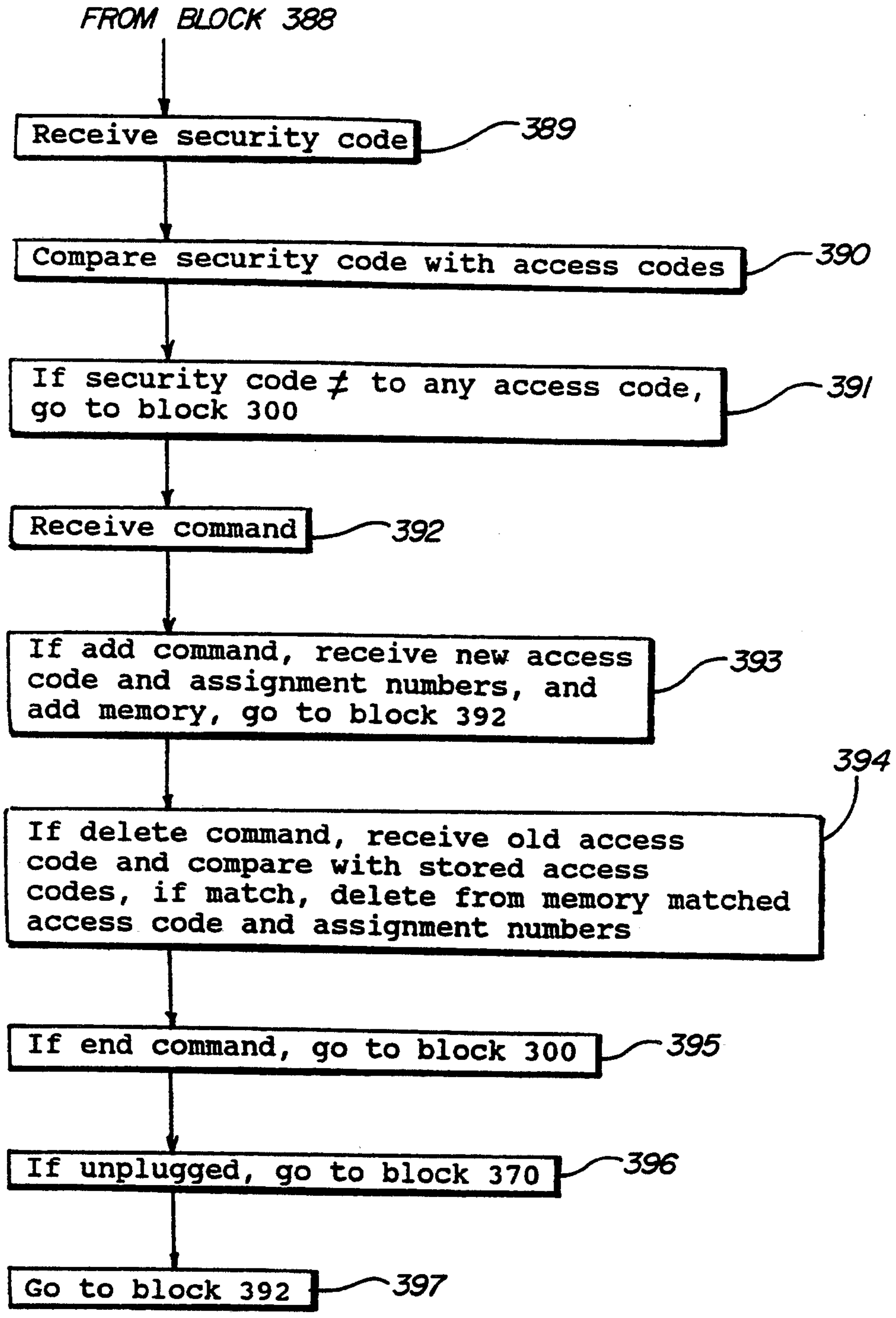

External communication is illustrated in FIGS. 7*a*–7*b*. The processor unit 178 generally extends communication to the PC interface 170 as indicated in block 370. The processor unit 178 will wait for the preset time in order to receive communication on the receive transmission line RXD from the PC interface 170 as indicated at block 374. If no communication is received within five minutes, the processor unit 178 will switch control to the remote programming unit interface 172 as indicated at block 376 only when it senses that the programmer means 132 is plugged in 130 on input TO. If communication is received within the time, the processor unit 178 receives the identification code from the computer 171 in block 378. The processor unit 178 gets the loop address code as set forth in block 380. If the identification code is not equal to the loop address, the code jumps to block 388. Otherwise, the processor unit 178 receives instructions from the computer 171 and operates under computer control as indicated in block 384. Upon reception of the data command, the processor unit 178 transmits the history data to the computer 171. The computer 171 may reprogram the data memory 162. In this case, all access codes and unit assignments are input to the computer 171 via the terminal. Upon designation of the identification code and the dump command and transmission of same to the processor unit 178, the processor unit 178 deletes all data in the data memory 162 and dumps the newly inputted access codes and unit assignments into the data memory 162 for storage and use thereof. When communication ends, the program is restarted to block 300. If the time expires in block 376 or the identification code does not equal the loop address, the processor unit 178 opens communication with the programmer means 132 if the programmer means 132 is plugged in.

The processor unit 178 receives the security code from the programmer means 132 as indicated in block 389. The processor unit 178 compares the security code with the access codes, and if the security code is not equal to any access code, the program restarts to block 300 as indicated in blocks 390–391. If the security code equals an access code, a command is received in block 392. If an add command is received, the processor unit 178 receives a new access code and assignment numbers and adds this data to the data memory 162 indicated at block 393. If a delete command is received, the old and inputted access code is compared with the stored access codes. If there is a match, the access code is deleted from the data memory 162 as indicated in block 394. If an end command is received, the processor unit 178 restarts at block 300. Otherwise, the next command is received as indicated in block 396.

Therefore, the processor unit 178 includes access means indicated by blocks 306–324 for receiving the input code and determining authorization of entry. Also included is key means indicated in blocks 324–332 for receiving the key code when the input code does not equal the access code stored in the data memory 162 and producing the unlock signal when the input code equals the key code. Also includes is selection means indicated by blocks 334–342 for retrieving the unit assignment numbers associated with the authorized access code equal to the input code and compares a selection number from the keyboard port 177 to the unit assignment numbers to allow opening of the storage unit 114 associated with He selection number when the selection number equals one of the unit assignment numbers. The processor unit 178 includes loop means for receiving said loop code upon communication through said interface means 142 and reception of a communication code from the external computer 171 and for allowing communication when the communication code equals the loop code. Reset access means for resetting the single access code is indicated by blocks 348–357. Communication and history and multiple access means is indicated by blocks 370–397.

Figure 8:
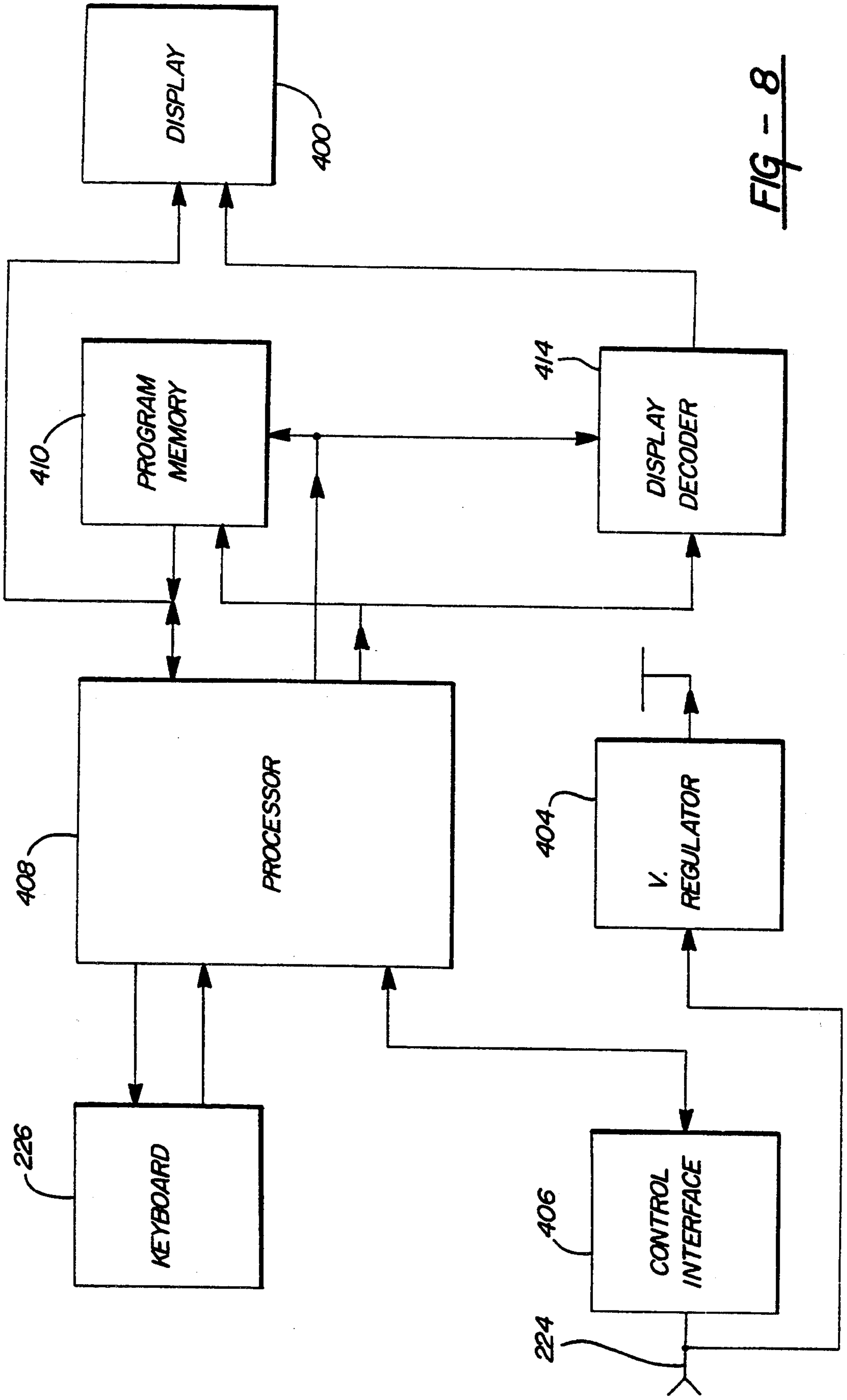
FIG. 8 is a block diagram of an optional remote programmer for the second embodiment.

The remote programming means 132 is generally indicated in FIG. 8. The remote programming means 132 includes a connector and cable 224 for electrical connection to the control means 110 through the programming port 130. The connector and cable comprises a long set of conductive wires insulated from each other so each wire may act as a medium for the transmission of separate and distinct electrical signals. The block diagram of the circuitry of the remote programming means 132 is illustrated in FIG. 8. A display 4005 is a standard crystal display (LCD) display and located on the remote programming means 132, such as LCD display #LM16255 produced by Sharp Incorporated. The remote programming means 132 also includes a keyboard 226. The keyboard 226 comprises two different types of keys; the mode keys 227 and the numerical keys 228. The mode keys 227 are six keys, each individually labelled "PROGRAM", "PROGRAM VERIFY", "NEXT", "DELETE", "YES" and "NO". The mode keys 227 determine what information is to be manipulated and how it is to be manipulated. The numerical keys 228 consists of a 2×3 matrix of keys numbered one (1) through six (6). The three functions of the numerical keys are: (i) to input a security code to gain access to the control means; (ii) to input and access code to be added, deleted or modified to the list of access codes stored by the control means; (iii) to input the storage units that may be accessed by inputting the particular access code. A remote voltage regulator 404 receives power from the long connecting cable 224 and supplies five volts DC to the rest of the remote programmer means 132. A control interface 406 is in electrical communication with the control means 110 via the cable 224. The control interface 406 receives from and transmits to the control means 110 information in relation to the programming of the control means 110. A processor 408 operates pursuant to the request made through the keypad 226 and receives its instruction from an EPROM memory 410. In addition, the processor 408 operates the EPROM memory 410 using control signals in conjunction with the high order address bits. The processor 408 operates a display decoder 414 which, in turn, operates the display module 400. The display decoder 414 decodes the address range in which the display data can be written.

The remote programming means 132 is turned on and plugged into the programming port 130. Upon plugging in, a signal is sent to the processor unit 178. Any computer communication on the computer interface 170 will have priority. Upon transmission by either the computer or remote programming unit 132, an interrupt will be sent to input RXD of the processor unit 178.

Thereafter, the "PROGRAM" key 227 is depressed. The microprocessor 178 is in the security mode and any code input via the numerical keys 228 will be checked against all acceptable access codes stored in the data memory 162. If the input code does not match any of the access codes, the remote programming means 132 turns off and waits for the "PROGRAM" key to be pressed. If the input code is correct, the remote programming means 132 becomes functional and it is able to access the microprocessor 178.

The processor 408 is able to operate in two different modes. The first mode, represented by the left-most branch in the flow chart in FIG. 9, beginning at branch point 412, adds additional access codes to the CMOS memory 162 or modifies drawer assignments for existing access codes. If the microprocessor 230 is signalled by the depression of the "YES" key representing that the new or modified access code has been properly entered, the processor unit 178 receives the signals of the numerical keys 228 which are pressed representing the storage units 114 that may be opened when the access code is used. When the processor 408 receives the signal from the "YES" key, signaling the completion of data entry, the processor 408 sends all information, i.e., the access code and the associate storage units 114 that may be accessed, to the control interface 406 where it will be sent to the microprocessor 178. The processor 408 will display the new access code and accessible storage unit 114 numbers by sending a signal to the display decoder 414 which operates the display module 400. If a signal from the "PROGRAM" key is received, the processor 408 will return to branch point 412. If not, the remote programming means 132 will automatically return to default position 416.

Figure 9:
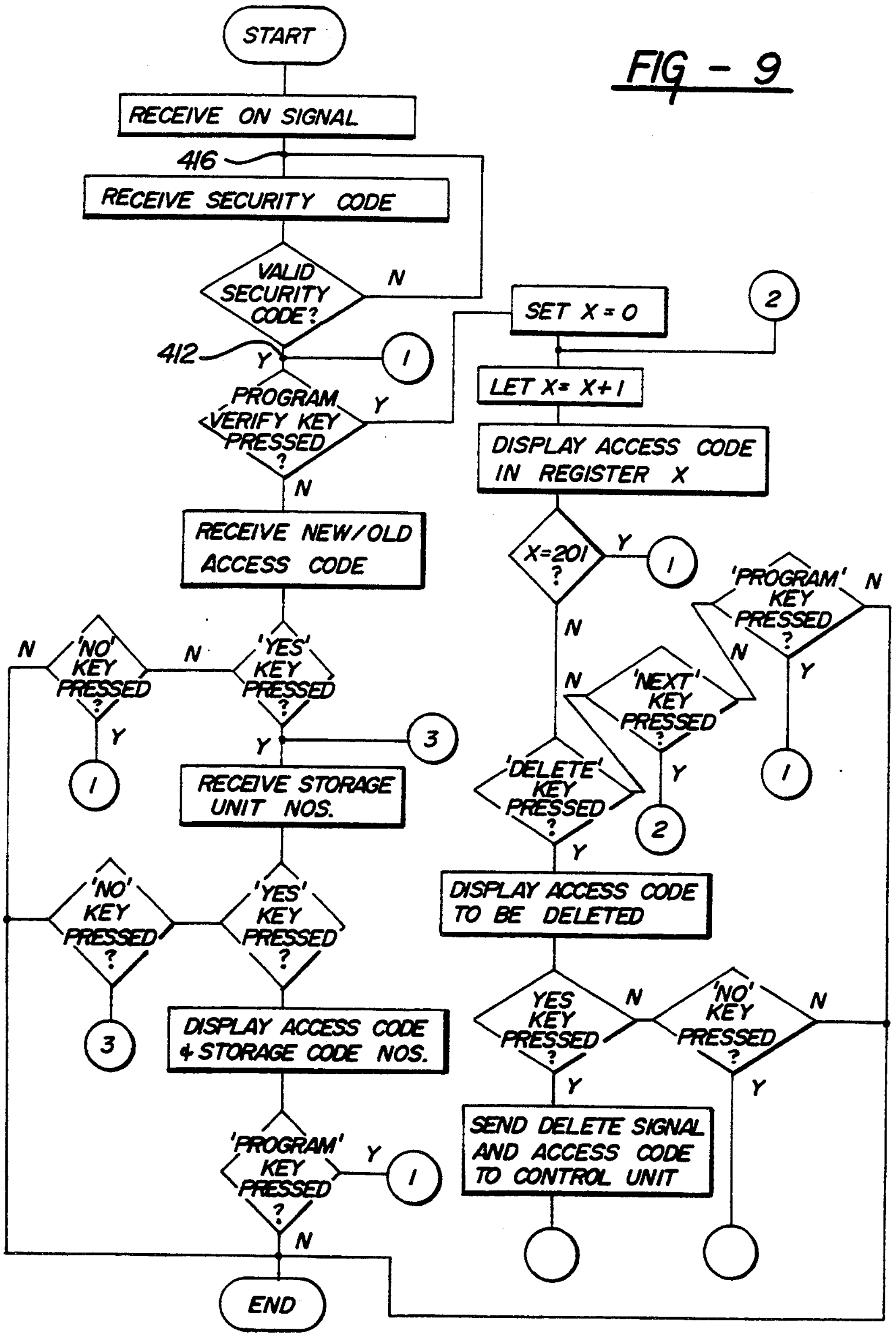
FIG. 9 is a flow chart of the remote programmer.

The second mode of operation, represented by the right-most branch, beginning at branch point 412, in FIG. 9, is the verification mode. The processor 408 automatically enters the verification mode when the "PROGRAM VERIFY" key is pressed. The processor 408 immediately sets a register counter X to zero (0). The processor 408 increments the value of X and checks the value of X (now one). If the value of X equals 201, the processor 408 returns to the branch point 412. If X is less than 201, the processor 408 will direct the access code in register X to be displayed. If the "DELETE" key is pressed, the processor unit 178 will delete the access code and register X only after the "YES" key has been pressed reaffirming the deletion. The "NEXT" key may be sequentially pressed to scroll through all the registers by incriminating X and deleting those not needed. The more specific structure and operation may be obtained from the referenced aforementioned patent application.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A file cabinet assembly (100) comprising:

housing means (12, 112) defining an enclosure;

a plurality of storage units (14, 114) slideably supported by said housing means (12, 112) for sliding between a closed position and an open position;

a plurality of electronically controlled independent locking means (16, 116) for receiving power and each operatively associated with one of said storage units (14, 114) and having a locked condition for contacting and locking said storage units (14, 114) in said closed position in response to a lock signal and having an unlocked condition for unlocking and allowing said storage units (14, 114) to slide to said open position in response to an unlock signal and for maintaining said storage units (14, 114) in said closed position and locked in response to discontinuation of power, electrical control means (18, 110) connected to said locking means (16, 116) for locking and unlocking said locking means (16, 116);

said control means (18, 110) including electrical input means (20, 120) for receiving an input code, electrical data memory means separate from said input means (20, 120) for storing a plurality of access codes, position means operatively connected to each of said storage units (14, 114) for producing an enable signal only when all of said storage units (14, 114) are in said closed position and a disable signal when at least one of said storage units (14, 114) is in said open position, and processor means connected to said input means (20, 120) and said data memory means (22, 162) and said position means and connected independently to each of said locking means for receiving and comparing said input code with said access codes to produce said unlock signal to only one of said locking means when said access code equals said input code and said enable signal is received and for limiting opening to only one of said storage units (14, 114) while the remaining storage units (14, 114) are maintained in said closed position with the associated locking means (16, 116) locked so that all of said storage units (14, 114)

must be in the closed position in order to unlock said only one storage unit (14, 114) and move said only one storage unit to the open position.

2. An assembly as set forth in claim 1 further characterized by data memory means (20, 162) including access memory and unit assignment memory for storing at said access codes and at least one unit assignment number associated with each of said storage units (14, 114).

3. An assembly as set forth in claim 2 further characterized by said processor means (224, 148) including selection means for retrieving said unit assignment number associated with said access code equal to said input code and comparing a selection number from said input means to said unit assignment numbers to allow opening of said storage unit (14, 114) associated with said selection number when said selection number equals one of said unit assignment numbers.

4. An assembly as set forth in claim 3 further characterized by said input means (20, 120) including a keypad having a plurality of momentary depressible keys for input of said input code and said selection number.

5. An assembly as set forth in claim 1 further characterized by said position means including sensing means (34, 134) independently associated with each of said storage units (14, 114) each for producing a close signal when said storage unit (14, 114) is in said closed position and an open signal when said storage unit (14, 114) is not in said open position.

6. An assembly as set forth in claim 5 further characterized by said position means including means (154) for receiving said close and open signals and for producing said enable signal when only said close signal is received and for producing said disable signal when at least one of said open signals is received.

7. An assembly as set forth in claim 1 further characterized by said control means (110) including timing means (135) for establishing a time delay after comparison of said input code with an access code and after the input of selection codes within which time said unlock signal will be produced to a selected storage unit (114), and after opening of a selected storage unit.

8. An assembly as set forth in claim 7 further characterized by said timing means (135) including a plurality of manual actuatable switches wherein each switch provides a value indicative of a selected time delay.

9. A file cabinet assembly (100) comprising:

housing means (12, 112) defining an enclosure;

a plurality of storage units (14, 114) slideably supported by said housing means (12, 112) for sliding between a closed position and an open position;

a plurality of electronically controlled independent locking means (16, 116) for receiving power and each operatively associated with one of said storage units (14, 114) and having a locked condition for contacting and locking said storage units (14, 114) in said closed position in response to a lock signal and having an unlocked condition for unlocking and allowing said storage units (14, 114) to slide to said open position in response to an unlock signal and for maintaining said storage units (14, 114) in said closed position and locked in response to discontinuation of power, electrical control means (18, 100) connected to said locking means (16, 116) for locking and unlocking said locking means (16, 116);

said control means (18, 110) including input means (20, 120) for receiving an input code, data memory means separate from said input means (20, 120) for storing an access code, said sensing means (34, 134) including a plurality of sensors each associated with at least one of said storage units (14, 114) for each producing a close signal when said storage unit (14, 114) is in said closed position and for producing an open signal when said storage unit (14, 114) is in said open position, position means (154) operatively connected to said sensing means for receiving all of said close and open signals and for producing an enable signal when only said close signals are received and for producing a disable signal when at least one of said open signals is received, and processor means connected to said input means (20, 120) and said data memory means (22, 162) and said position means and connected independently to each of said locking means for receiving and comparing said access code with said input code to produce said unlock signal to only one of said locking means when said access code equals said input code and said enable signal is received and for limiting opening to only one of said storage units (14, 114) while the remaining storage units (14, 114) are maintained in said closed position with the associated locking means (16, 116) locked so that all of said storage units (14, 114) must be in the closed position in order to unlock said only one storage unit (14, 114) and move said only one storage unit to the open position.

10. An assembly as set forth in claim 9 further characterized by said sensors including interlock switches associated with each of said storage units (14, 114) for producing said close and open signals.

11. An assembly as set forth in claim 9 further characterized by said data memory means (22, 162) including access memory for storing a plurality of access codes.

12. An assembly as set forth in claim 11 further characterized by said data memory means (22, 162) including unit assignment memory for storing at least one access code and unit assignment number associated with each access code and associated with each of the storage units (14, 114).

13. A method of providing limited access to a file cabinet assembly (10, 100) having a plurality of storage units (14, 114) moveable between a closed position and an open position within a housing (12, 112), the method including the steps of:

receiving power, storing a plurality of access codes, receiving an input code, sensing the position of all of the storage units (14, 114) and producing an electrical position signal indicative of the positions, producing an electrical enable signal only when all of the storage units (14, 114) are in the closed position based on the position signals, producing an electrical disable signal when at least one of the storage units (14, 114) is in the open position, locking the storage units (14, 114) by electrical control in the closed position when the input code is not equal to the access code, locking the storage units (14, 114) when power is discontinued, comparing the input code to the stored access codes, independently unlocking only one of the storage units (14, 114) by electrical control from the closed position when the input code equals the access code and the enable signal is produced and power is received, and retaining the remaining storage units (14, 114) locking so that all of the storage units must be in the closed position to allow only one storage unit to be opened.

14. A method as set forth in claim 13 further including storing unit assignment numbers with selective access codes in memory wherein each unit assignment number identifies a specific one of the storage units.

15. A method as set forth in claim 14 further including retrieving the unit assignment number associated with the access code equal to the input code and comparing a selection number from the input to the unit assignment number to allow opening of the storage unit associated with the selection number when the selection number equals one of the unit assignment numbers.

16. A method as set forth in claim 15 further including inputting the input code and selection number by actuating selected momentary depressible contact keys.

17. A method of providing limited access to a file cabinet assembly (10, 100) having a plurality of storage units (14, 114) moveable between a closed position and an open position within a housing (12, 112), the method including the steps of:

receiving power, storing an access code, receiving an input code, individually sensing the position of each of the storage units (14, 114) and producing an electrical signal for each storage unit indicative of the position thereof producing a plurality of open and close signals depending on the associated position of the storage unit between either open or close, receiving all of the individual open and close signals, producing a separate and remote electrical enable signal only when all of the received signals are close signals and all of the storage units (14, 114) are in the closed position, producing an electrical disable signal when at least one of the received signals is an open signal and at least one of the storage units (14, 114) is in the open position, receiving the enable or disable signal and locking the storage units (14, 114) by electrical control in the closed position when the input code is not equal to the access code, locking the storage units (14, 114) when power is discontinued, independently unlocking only one of the storage units (14, 114) by electrical control from the closed position when the input code equals the access code and the enable signal is produced and power is received, and retaining the remaining storage units (14, 114) locked so that all of the storage units must be in the closed position to allow only one storage unit to be opened.

18. A file cabinet assembly (100) comprising:

housing means (12, 112) defining an enclosure;

a plurality of storage units (14, 114) supported by said housing means (12, 112) for moving between a closed position and an open position;

electronically controlled locking means (16, 116) for receiving power and operatively associated with each of said storage units (14, 114) and having a locked condition for contacting and locking said storage units (14, 114) in said closed position in response to a lock signal and having an unlocked condition for unlocking and allowing said storage units (14, 114) to move to said open position in response to an unlock signal and for maintaining said storage units (14, 114) in said closed position and locked in response to discontinuation of power;

electrical control means (18, 110) connected to said locking means (16, 116) for locking and unlocking said locking means (16, 116);

said control means (18, 110) including electronic input means (20, 120) for receiving an input code, electronic data memory means separate from said input means (20, 120) for storing a plurality of access codes, electronic sensing means operatively connected to said storage units for producing an electrical signal indicative of the respective storage unit being in the closed position or open position, history memory means for storing operational information regarding reception of an input code and use of said access codes and a subsequent opening of a storage unit, processor means operatively connected to said input means (20, 120) and said data memory means (22, 162) and said history memory means and said locking means for receiving and comparing said input code with said access codes to produce said unlock signal to only one of said locking means when said access code equals said input code and all of said storage units are in said closed position allow opening of one of said storage units when said input code has a predetermined relationship with said access codes and to store the occurrence of the relationship and access code and sensed opening of a storage unit in said history memory means for subsequent electronic recall and for limiting opening to only one of said storage units while the remaining storage units are maintained in said closed position with the associated locking means locked so that all of said storage units must be in the closed position in order to unlock a storage unit.

19. An assembly as set forth in claim 18 further characterized by including interface means (42, 142) for communicating with an external computer for transferring information from said history memory means.

20. An assembly as set forth in claim 19 further characterized by said control means including loop address means for establishing a loop code.

21. An assembly as set forth in claim 20 further characterized by said processor means including loop means for receiving said loop code upon communication through said interface means and for receiving a communication code from the external computer to allow communication therebetween when said communication code has a predetermined relation with said loop code.

22. An assembly as set forth in claim 18 further characterized by said control means including position means operatively connected to said storage units to produce an enable signal only when all of said storage units are in said closed position and a disable signal when at least one of the said storage units is in said open position, and said processor means including means connected to said input means and said data means and said position means and connected independently to each of said locking means for receiving and comparing said access codes with said input code to produce said unlock signal to only one of said locking means when said access code equals said input code and said enable signal is received and for limiting opening to only one of said storage units while the remaining storage units are maintained in said closed position with the associated locking means locked so that all of said storage units must to in the closed position in order to unlock said only one storage unit and move said only one storage unit to the open position.

23. A file cabinet assembly (100) comprising:

housing means (12, 112) defining an enclosure;

a plurality of storage units (14, 114) supported by a housing means (12, 112) for moving between a closed position and open position;

electronically controlled locking means (16, 116) for receiving power and operatively associated with each of said storage units (14, 114) and having a locked condition for contacting and locking said storage units (14, 114) in said closed position in response to a lock signal and having an unlocked condition for unlocking and allowing said storage units (14, 114) to move to said open position in response to an unlock signal and for maintaining said storage units (14, 114) in said closed position and locked in response to discontinuation of power;

electrical control means (18, 110) connected to said locking means (16, 116) for locking and unlocking said locking means (16, 116);

said control means (18,110) including electronic input means (20, 120) for receiving an input code, electronic data memory means for storing a plurality of access codes, electronic sensing means for producing an electrical signal indicative of the respective storage unit being in the closed position or open position, interface means for communication with an external computer to transfer information therewith, and processor means operatively connected with said input means and said data memory means and said interface means for receiving and comparing said input code with said access codes to produce said unlock signal to only one of said locking means when said access code equals said input code to allow opening of one of said storage units when said input code has a predetermined relationship with said access codes and for communicating information and said access codes with the external computer through control of said interface means and for limiting opening to only one of said storage units while the remaining storage units are maintained in said closed position with the associated locking means locked so that all of said storage units must be in the closed position in order to unlock a storage unit.

24. An assembly as set forth in claim 23 further characterized by said control means including loop address means for establishing a loop code.

25. An assembly as set forth in claim 24 further characterized by said processor means including loop means for receiving said loop code upon communication through said interface means and for receiving a communication code from the external computer to allow communication therebetween when said communication code has a predetermined relation with said loop code.

26. An assembly as set forth in claim 23 further characterized by said control means including position means operatively connected to said storage units to produce an enable signal only when all of its storage units in said closed position and a disable signal when at least one of the said storage units is in said open position, and said processor means including means connected to said input means and said data means and said position means and connected independently to each of said locking means for receiving and comparing said access codes with said input code to produce said unlock signal to only one of said locking means when said access code equals said input code and said enable signal is received and for limiting opening to only one of said storage units while the remaining storage units are maintained in said closed position with the associated locking means locked so that all of said storage units must to in the closed position in order to unlock said only one storage unit and move said only one storage unit to the open position.

27. An assembly as set forth in claim 23 further characterized by said control means including electronic history memory means for storing operational information regarding reception of an input code and use of said access codes and opening of storage units such that said processor stores the occurrence of the relationship between said input code and access codes and an opening of a storage unit in said history memory means for subsequent electronic recall.

* * * * *